US005659833A

[11] Patent Number: 5,659,833
[45] Date of Patent: Aug. 19, 1997

United States Patent [19]
FitzGerald

[54] RELOADABLE FILM CANISTER SYSTEM

[75] Inventor: Kevin A. FitzGerald, Fountain Valley, Calif.

[73] Assignee: Anacomp, Inc., Atlanta, Ga.

[21] Appl. No.: 589,831

[22] Filed: Jan. 22, 1996

Related U.S. Application Data

[60] Provisional application Nos. 60/008,034, Oct. 30, 1995, and 60/002,012, Aug. 7, 1995.

[51] Int. Cl.$^6$ .............................. G03B 17/26; G03B 1/60
[52] U.S. Cl. .............. 396/512; 242/348.4; 242/563.2; 242/598; 396/284
[58] Field of Search ...................... 354/275, 217, 354/218; 352/72, 78 R; 242/344, 348, 348.4, 563.2, 598; 353/26 R; 396/512, 513, 514, 515, 516, 538, 511, 284

[56] References Cited

U.S. PATENT DOCUMENTS

| | | |
|---|---|---|
| Re. 30,939 | 5/1982 | d'Alayer de Costemore d'Arc et al. ............. 318/7 |
| 1,538,510 | 5/1925 | Bonk, Jr. . |
| 1,751,593 | 3/1930 | Merle . |
| 1,810,324 | 6/1931 | Owens . |
| 1,829,332 | 10/1931 | Beck . |
| 1,871,233 | 8/1932 | Proctor . |
| 2,011,624 | 8/1935 | Della Gana ............................... 242/71 |

(List continued on next page.)

FOREIGN PATENT DOCUMENTS

| | | |
|---|---|---|
| 3715179 A1 | 7/1987 | Germany . |
| A3715179 | 11/1988 | Germany . |
| A-56-11670 | of 1981 | Japan . |
| 63-13187 | 6/1986 | Japan . |
| 63-013187 | 1/1988 | Japan . |

*Primary Examiner*—A. A. Mathews
*Attorney, Agent, or Firm*—Dressler, Rockey, Milnamow & Katz, Ltd.

[57] ABSTRACT

A reloadable film canister system provides light-tight and dust-free enclosure for 105 mm microfilm and the like. A gear-toothed reel inside the canister meshes with a gear assembly of the canister and linearly drives a detectable element adjacent a sensing element located in a host machine.

28 Claims, 16 Drawing Sheets

U.S. PATENT DOCUMENTS

| | | | |
|---|---|---|---|
| 2,756,940 | 7/1956 | Lessler | 242/71 |
| 3,150,840 | 9/1964 | Briskin et al. | 242/55.13 |
| 3,199,117 | 8/1965 | Bosley | 352/172 |
| 3,252,370 | 5/1966 | Luther | 353/26 R |
| 3,379,108 | 4/1968 | Beyer et al. | 396/512 |
| 3,463,409 | 8/1969 | Stark | 242/348 |
| 3,490,348 | 1/1970 | Ariyasu et al. | 396/512 |
| 3,536,276 | 10/1970 | Bundschuh et al. | 242/348 |
| 3,564,219 | 2/1971 | Mutziger et al. | 235/92 |
| 3,620,610 | 11/1971 | Carlson | 352/172 |
| 3,670,638 | 6/1972 | Lindsay | 396/512 |
| 3,701,495 | 10/1972 | Holliday | 242/197 |
| 3,726,492 | 4/1973 | Koizjmi et al. | 242/201 |
| 3,730,453 | 5/1973 | Hotchkiss et al. | 242/191 |
| 3,734,052 | 5/1973 | Feldman | 116/114 |
| 3,757,057 | 9/1973 | Fleming | 179/100.2 R |
| 3,779,483 | 12/1973 | Inoue | 242/191 |
| 3,816,842 | 6/1974 | Glaros et al. | 396/512 |
| 3,857,032 | 12/1974 | Van Englehoven | 250/231 R |
| 3,883,090 | 5/1975 | Hall, Sr. | 242/199 |
| 3,917,142 | 11/1975 | Guarderas | 226/38 |
| 3,917,190 | 11/1975 | Richt | 242/191 |
| 3,938,041 | 2/1976 | Louth et al. | 324/158 R |
| 3,949,856 | 4/1976 | Ulber et al. | 197/133 R |
| 3,977,776 | 8/1976 | Wagensonner et al. | 352/171 |
| 4,001,552 | 1/1977 | Muller | 235/92 DN |
| 4,021,828 | 5/1977 | Iura et al. | 354/217 |
| 4,044,233 | 8/1977 | Sato | 235/92 PE |
| 4,089,487 | 5/1978 | Ichikawa et al. | 242/186 |
| 4,148,579 | 4/1979 | Axelrod et al. | 354/275 |
| 4,153,361 | 5/1979 | Axelrod . | |
| 4,172,231 | 10/1979 | d'Alayer de Costemore d'Arc et al. | 318/7 |
| 4,174,888 | 11/1979 | Hunn et al. | 352/170 |
| 4,196,985 | 4/1980 | Kratt | 352/172 |
| 4,232,371 | 11/1980 | Kamoto | 364/561 |
| 4,280,159 | 7/1981 | Nakayama | 360/137 |
| 4,304,480 | 12/1981 | Fukahori et al. | 354/173 |
| 4,338,645 | 7/1982 | Mohri et al. | 360/137 |
| 4,347,538 | 8/1982 | Klank | 360/137 |
| 4,418,994 | 12/1983 | Gottschalk et al. | 352/78 R |
| 4,443,007 | 4/1984 | Adamoski et al. | 271/269 |
| 4,443,077 | 4/1984 | Tanikawa | 354/21 |
| 4,479,159 | 10/1984 | Kamei et al. | 360/137 |
| 4,486,083 | 12/1984 | Takada et al. | 354/203 |
| 4,549,808 | 10/1985 | Ernst | 356/374 |
| 4,575,778 | 3/1986 | Vogelgesang | 360/132 |
| 4,627,695 | 12/1986 | Beauviala et al. | 352/72 |
| 4,652,105 | 3/1987 | Angeli | 354/121 |
| 4,653,886 | 3/1987 | Malloy Desormaux | 354/214 |
| 4,687,311 | 8/1987 | Malloy Desormaux | 354/217 |
| 4,696,440 | 9/1987 | Harigaya et al. | 242/191 |
| 4,758,851 | 7/1988 | Zeth | 354/72 |
| 4,767,079 | 8/1988 | Saito et al. | 242/197 |
| 4,805,053 | 2/1989 | Yamanaka et al. | 360/72.3 |
| 4,806,960 | 2/1989 | Momot et al. | 354/21 |
| 4,832,275 | 5/1989 | Robertson | 242/71.1 |
| 4,834,306 | 5/1989 | Robertson et al. | 242/71.1 |
| 4,839,678 | 6/1989 | Zawodny et al. | 354/217 |
| 4,848,693 | 7/1989 | Robertson | 242/71.1 |
| 4,887,112 | 12/1989 | Niedosplal, Jr. et al. | 354/275 |
| 4,918,485 | 4/1990 | Ishii et al. | 355/64 |
| 4,938,429 | 7/1990 | Robertson et al. | 242/71.1 |
| 4,987,300 | 1/1991 | Robertson | 250/231.14 |
| 5,003,333 | 3/1991 | Earnhart | 354/218 |
| 5,014,923 | 5/1991 | Robertson | 242/55 |
| 5,018,040 | 5/1991 | Nishida | 360/137 |
| 5,023,642 | 6/1991 | Pagano | 354/275 |
| 5,049,911 | 9/1991 | Shimizu | 354/217 |
| 5,053,795 | 10/1991 | Wyman | 354/275 |
| 5,153,625 | 10/1992 | Weber | 354/173.1 |
| 5,156,354 | 10/1992 | Robertson et al. | 242/71.1 |
| 5,247,323 | 9/1993 | Weber | 354/173.1 |
| 5,389,992 | 2/1995 | Weber | 354/173.1 |
| 5,482,223 | 1/1996 | Bresina et al. | 242/348.4 |
| 5,572,271 | 11/1996 | Pelican | 396/512 |

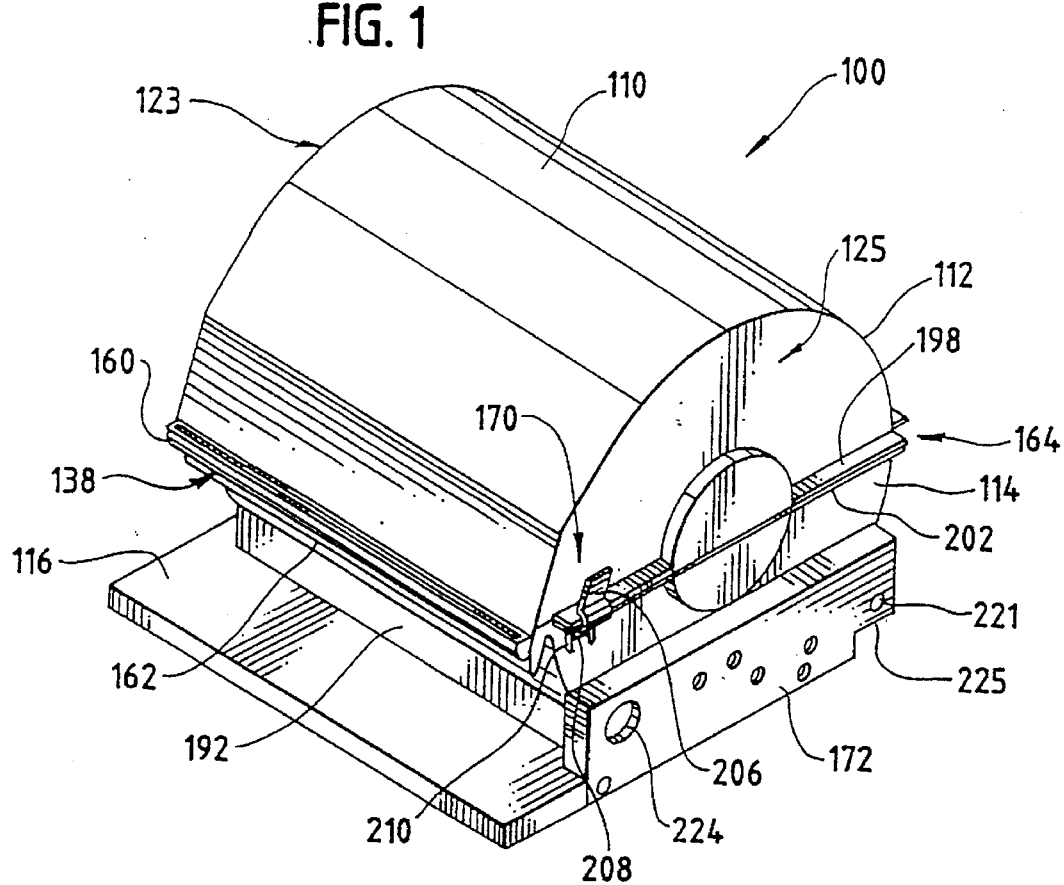
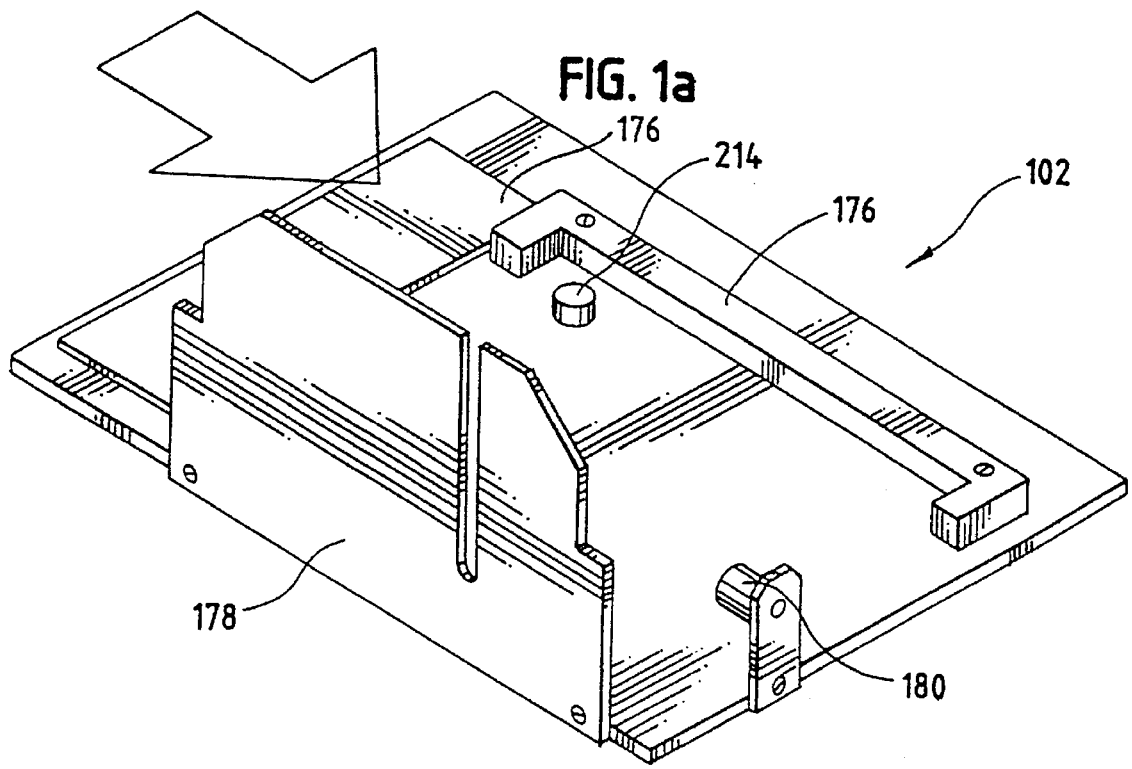

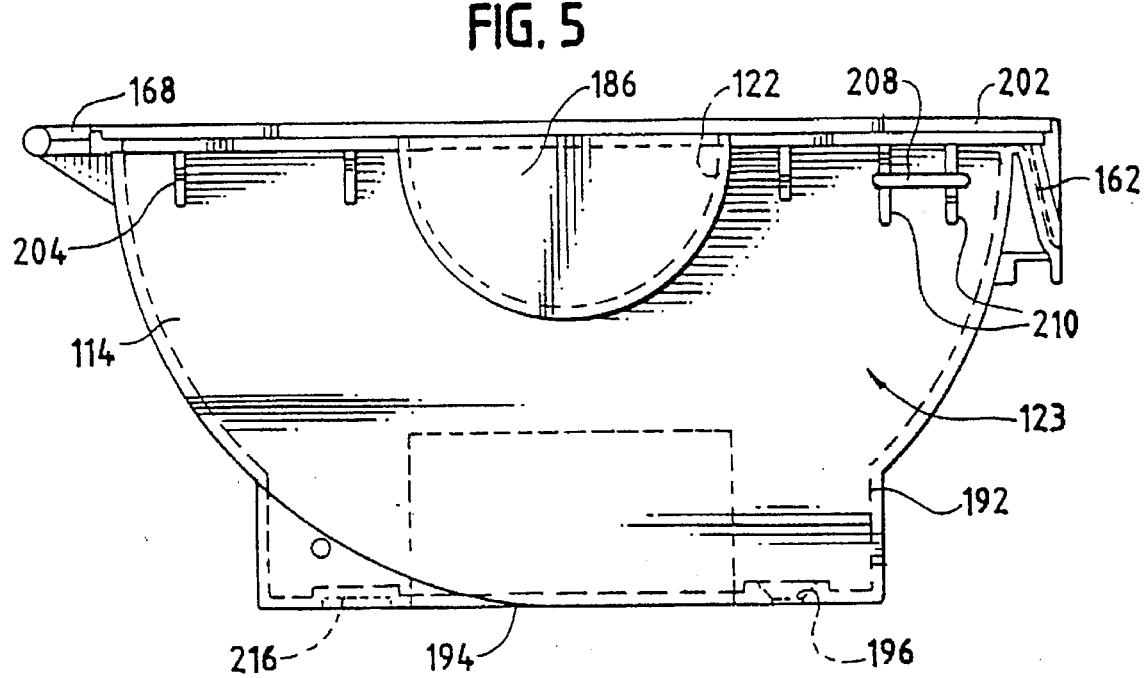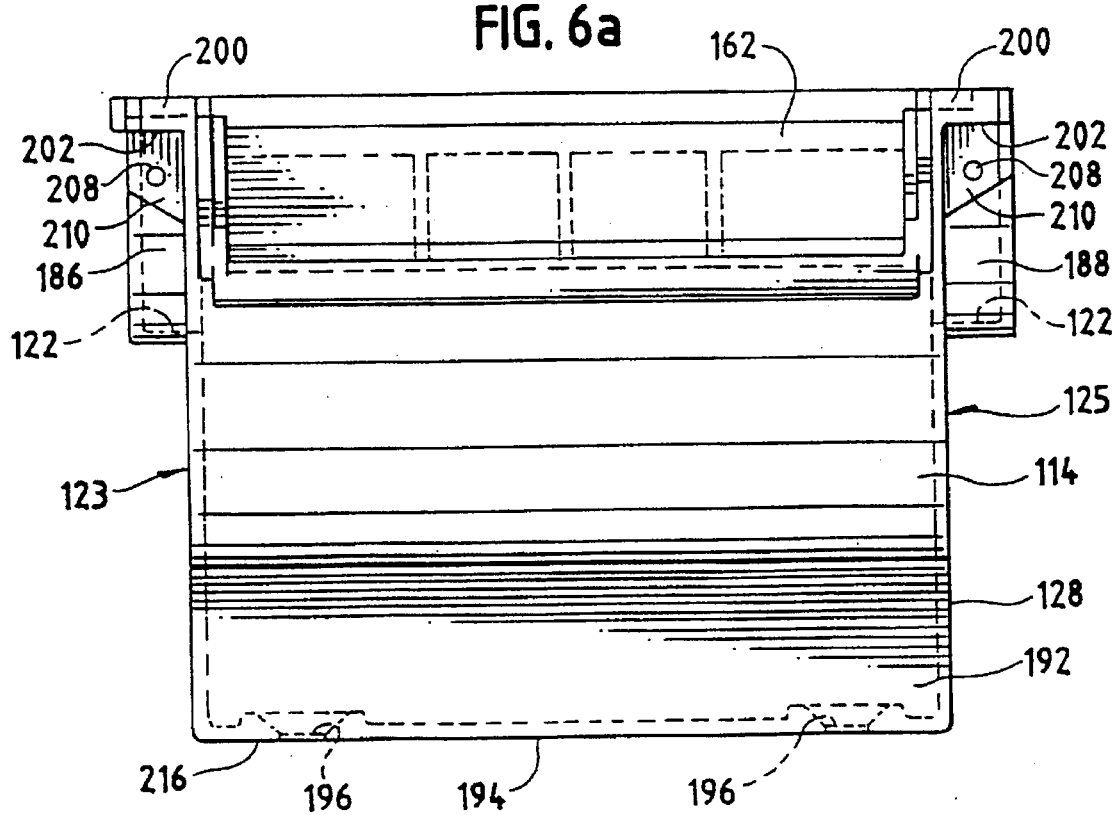

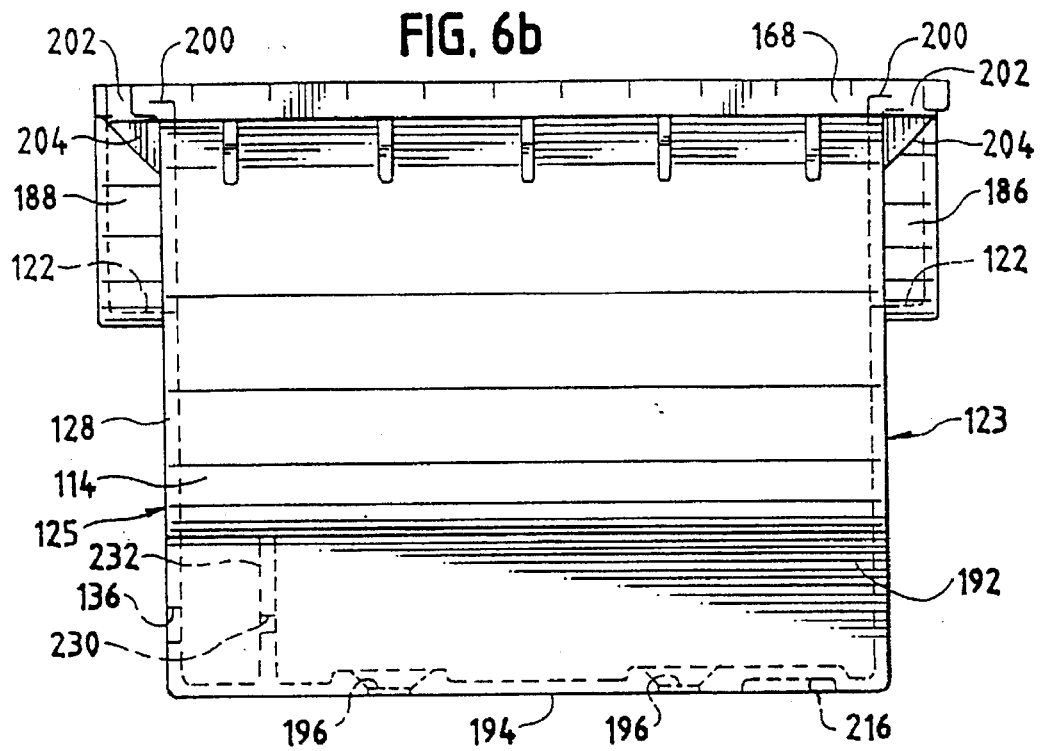
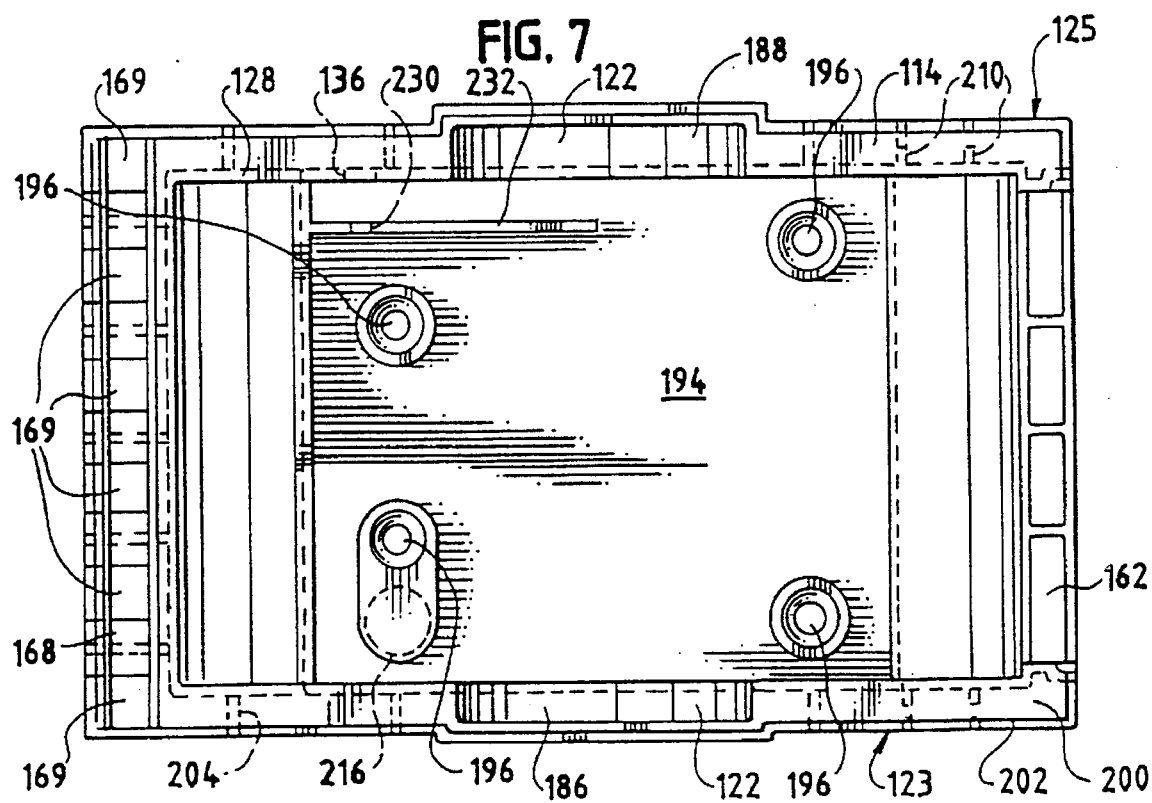

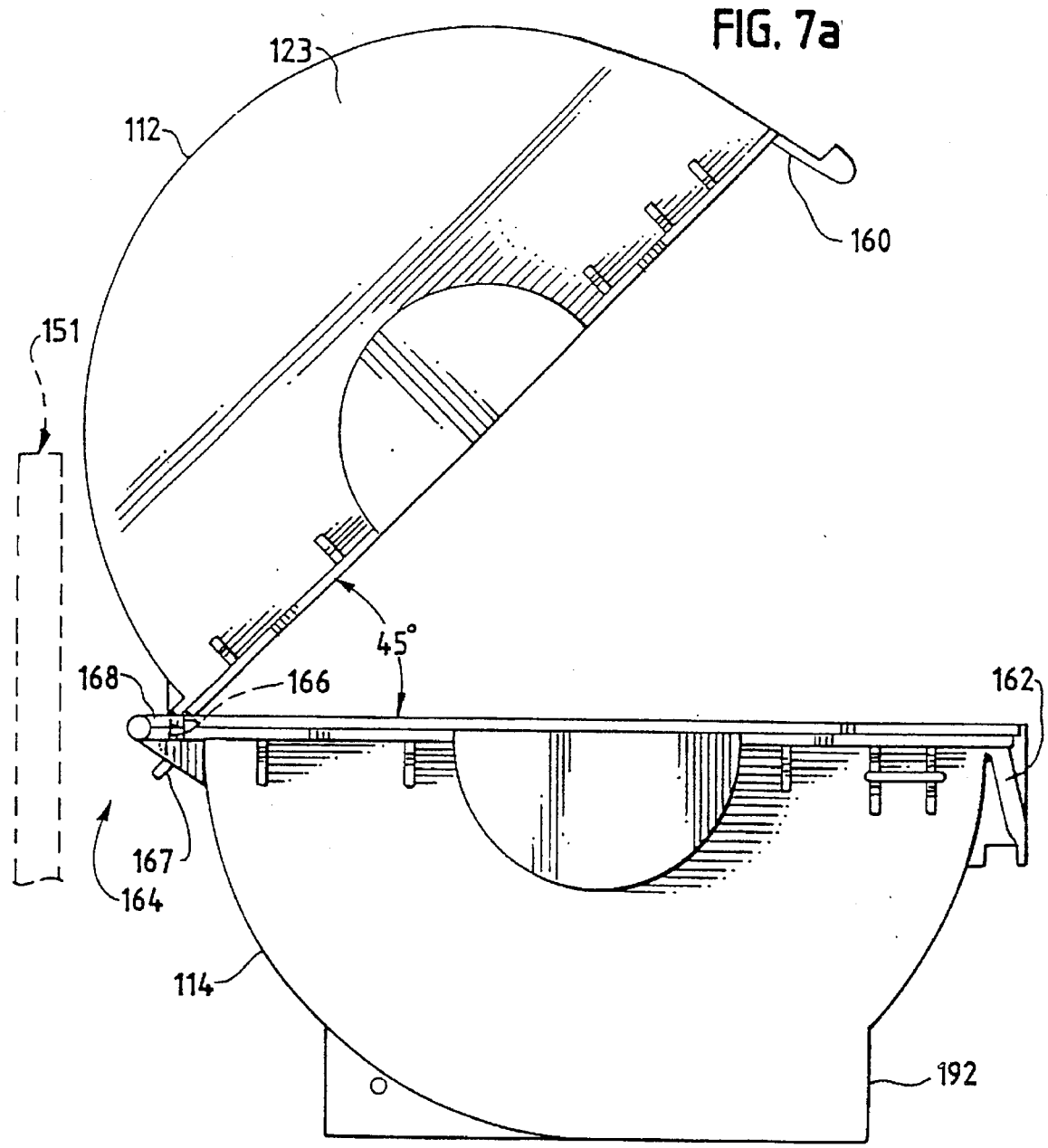

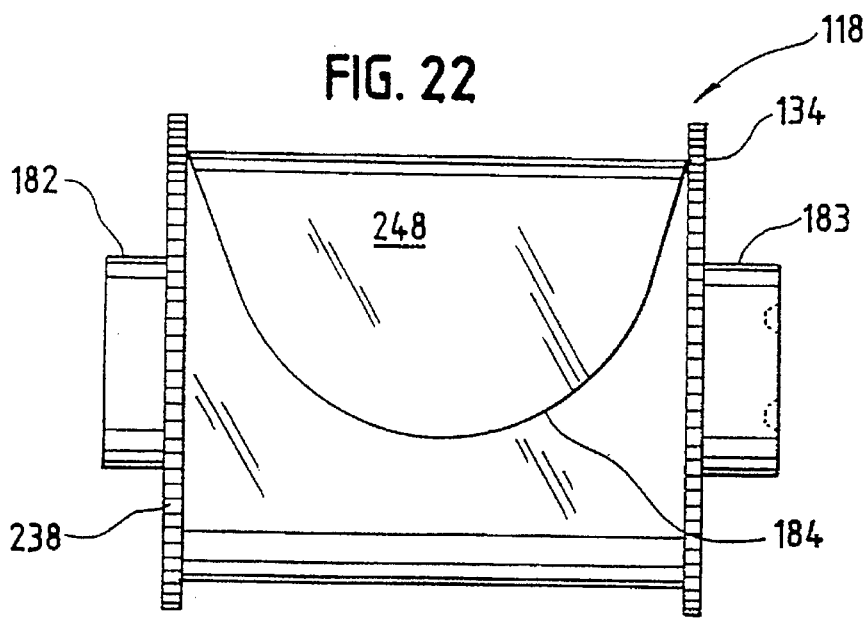
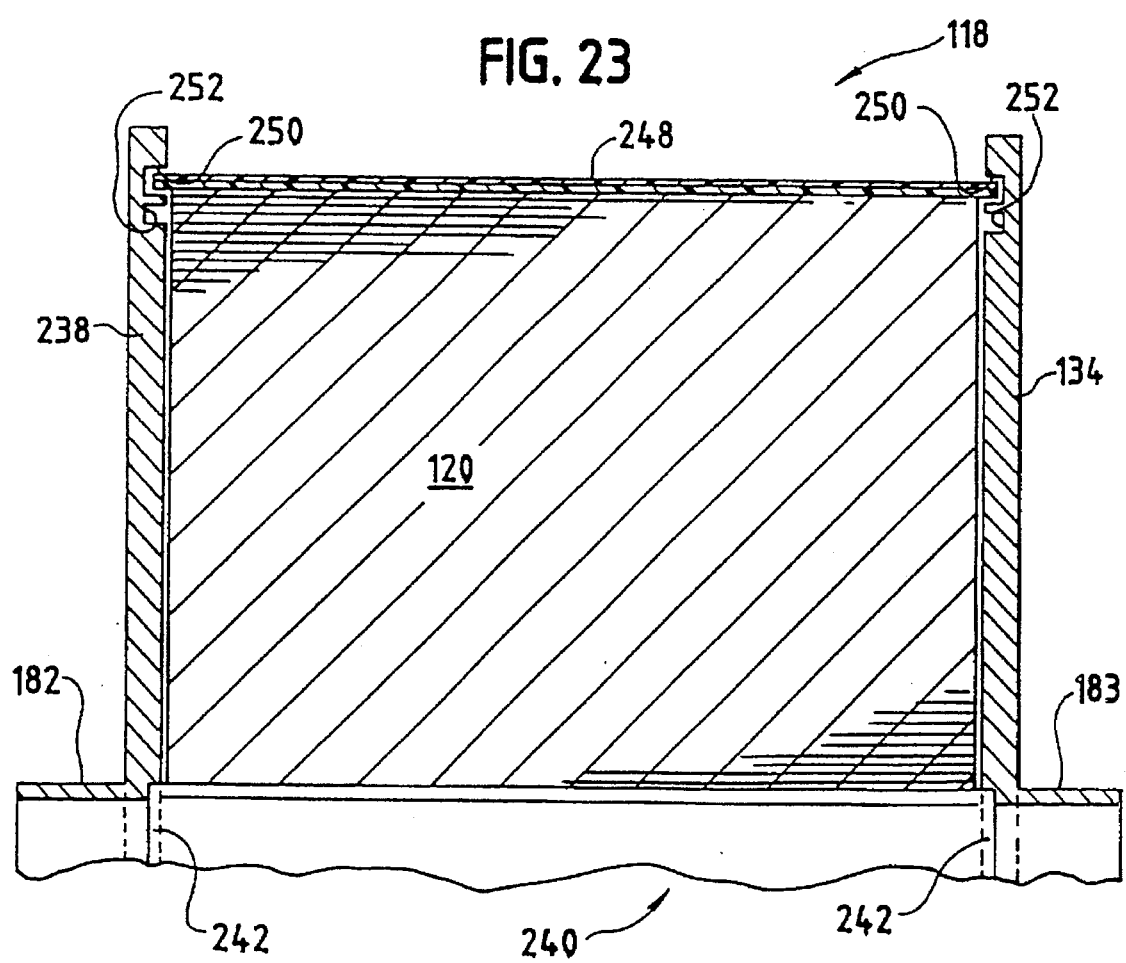

RELOADABLE FILM CANISTER SYSTEM

RELATED APPLICATIONS

Under 35 U.S.C. 119(e)(1), this application is a continuation-in-part of pending provisional application U.S. Ser. No. 60/008,034, filed Oct. 30, 1995 for RELOADABLE FILM CANISTER SYSTEM, and pending provisional application U.S. Ser. No. 60/002,012, filed Aug. 7, 1995 for RELOADABLE FILM CANISTER SYSTEM.

BACKGROUND OF THE INVENTION

The present invention relates to a reloadable film canister and particularly to a canister for holding unexposed microfilm used to store blocks of data from camera systems connected to a host computer. Representative prior art for microfilm canisters are disclosed in U.S. Pat. Nos. 4,153,361, 4,987,300, 5,153,625, 5,247,323 and 5,389,992. Typically, the stored microfilm is 105 mm wide and is wound around a core or reel that is inserted into the canister and freely rotates therein. The canister is typically constructed in two segments and has an exit slot for the film. Plush or foam material strips provide a light barrier as the film is pulled out of the canister for use by the camera system or other host machine.

U.S. Pat. No. 4,153,361 discloses a light-tight web cassette for microfilm or the like having supply and take up cartridges mounted thereon. A web detector includes a rotatable, detectable disc external of the cassette. An electrical pulse is generated each time a detectable mark on the rotating disc passes between a light source and photocell, as the two cartridges in the cassette are rotated.

U.S. Pat. No. 4,987,300 describes a system utilizing an optical-mechanical mechanism for a web-roll mounted within a cartridge. A movable flag is rotatably mounted to an underside of the cartridge and is pivoted as the web-roll rotates to interrupt a continuous beam of light of an optical sensing means passing under the cartridge. A light source and photodetecting pair forming the optical sensing means are spaced such that one element of the pair is positioned exterior to the cartridge. A spring-biased member couples the flag with a flange on the web-roll for pivoting of the flag, and a flange lip follower engages spaced notches on the flange lip such that reverse rotation of the web-roll is prevented.

U.S. Pat. Nos. 5,153,625, 5,247,323 and 5,389,992 describe a system in which a field modulating disc is typically located within the light-tight film enclosure. Rotation of this field modulated disc is sensed by an external sensor which generates electrical pulses during the rotation of the reel. These pulses provide information which is accumulated, stored and displayed so that the amount of film removed and, more importantly, the amount of film remaining is known without opening of the canister for visual inspection. Knowledge of the depletion of the film is required to prevent having to splice two rolls of film together when a first roll is expended before all the data are recorded onto the film. It is also desirous to know the film usage to allow a margin for threading of the film into developer equipment, so that data is not lost due to exposure of the film to light.

Heretofore, the above described prior art microfilm canisters offered for sale have not been reloadable by the user. As a result, a significant amount of waste occurs because of the disposal of the canisters after a single use. Moreover, the ultimate user has not been able to use microfilm from a number of film manufacturers, but is instead obligated to discard the canister when each roll of film is depleted and substitute a filled canister purchased from the manufacturer that supplied the system.

SUMMARY OF THE INVENTION

Reloadable film canister systems constructed in accordance with the present invention provide several significant advantages.

One important feature of the preferred embodiment of the present invention is that the canister system is compatible for use with prior art systems already installed in some host machines. Such prior art systems are disclosed, for example, in U.S. Pat. Nos. 4,987,300 and 5,153,625.

The unexposed microfilm is loaded onto a gear-toothed reel, and this gear in turn has a direct physical interaction with a detectable element external to the light-tight canister which, in the preferred embodiment, moves in a reciprocal linear path proximate the sensor of the host machine which computes the length of film removed from the reel and the amount of film remaining may be determined. Accordingly, the preferred embodiment of the present invention does not employ a rotating disc or other type of rotating detectable members.

A base plate supports the film, reel, canister and detectable assembly. Cutouts on the base plate reduce its weight and also facilitate the placement of the canister system in a supporting region of the host machine.

Another feature of the preferred embodiment is that microfilm may be easily loaded into the light-tight enclosure after the film within the enclosure has been used up. This film can be easily loaded in full or subdued daylight. To this end, a mylar leader is used with the film on the reel to prevent exposure to light during the loading of the reel into the canister or the removal of the reel from the canister. A tab on the mylar leader facilitates film insertion into a feed-roller assembly or other access to the film on the reel and the mylar leader is withdrawn after the enclosure has been closed.

In the preferred embodiment, the light-tight canister includes an upper and lower housing hinged in a clam-shell configuration allowing a 45 degree opening of the upper housing relative to the lower housing for removal of the upper housing in order to facilitate easy removal of the spent microfilm reel and installation of a reel loaded with unexposed microfilm into the canister.

Further advantages and applications will become apparent to those skilled in the art from the following detailed description and the drawings referenced herein.

BRIEF DESCRIPTION OF THE DRAWINGS

FIG. 1 shows a perspective view of the right side of a reloadable film canister system constructed in accordance with a preferred embodiment of the present invention;

FIG. 1a shows a perspective view of the mounting region of the host machine which receives the system of the present invention;

FIG. 5 shows a left side elevational view of the lower housing member of the reloadable film canister system of FIG. 1;

FIGS. 6a and 6b are front and rear elevational views, respectively, of the lower housing member of FIG. 5;

FIG. 7 shows a top plan view of the lower housing member of FIG. 5;

FIG. 7a shows a side elevational view of the upper housing member in an open position relative to the lower housing member;

FIG. 13b shows a top view along lines 13b—13b of FIG. 13a;

FIG. 22 shows a front elevational view of the film with the mylar leader loaded on the reel; and FIG. 23 shows a cross-sectional view of the reel and film with the mylar leader of FIG. 22.

DETAILED DESCRIPTION OF THE PREFERRED EMBODIMENT

Figure 2:
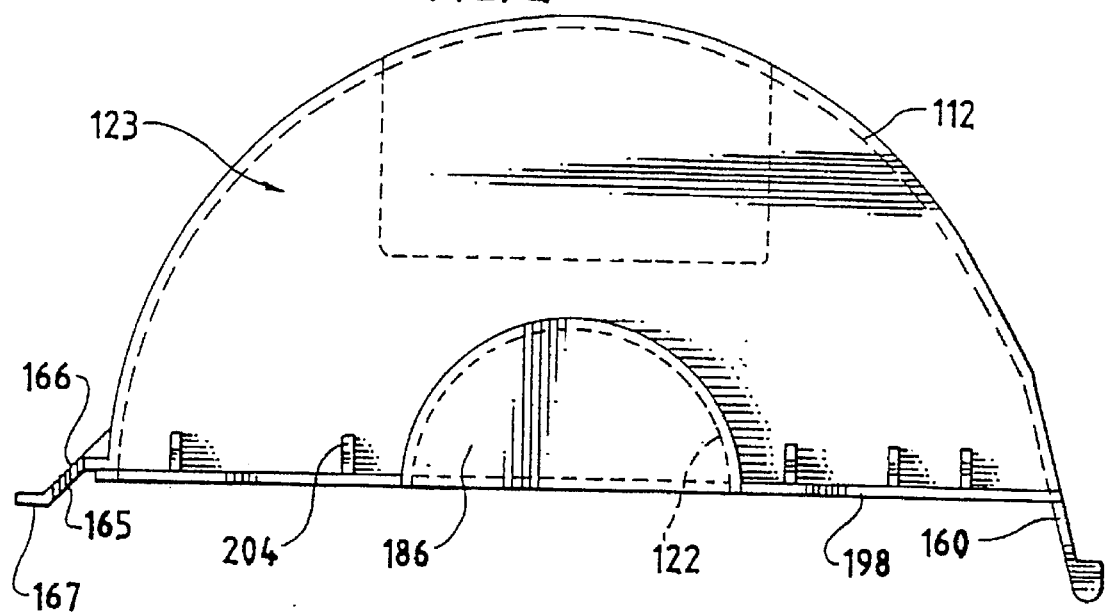
FIG. 2 shows a left side elevational view of the upper housing member of the reloadable film canister system of FIG. 1.
Figure 3A:
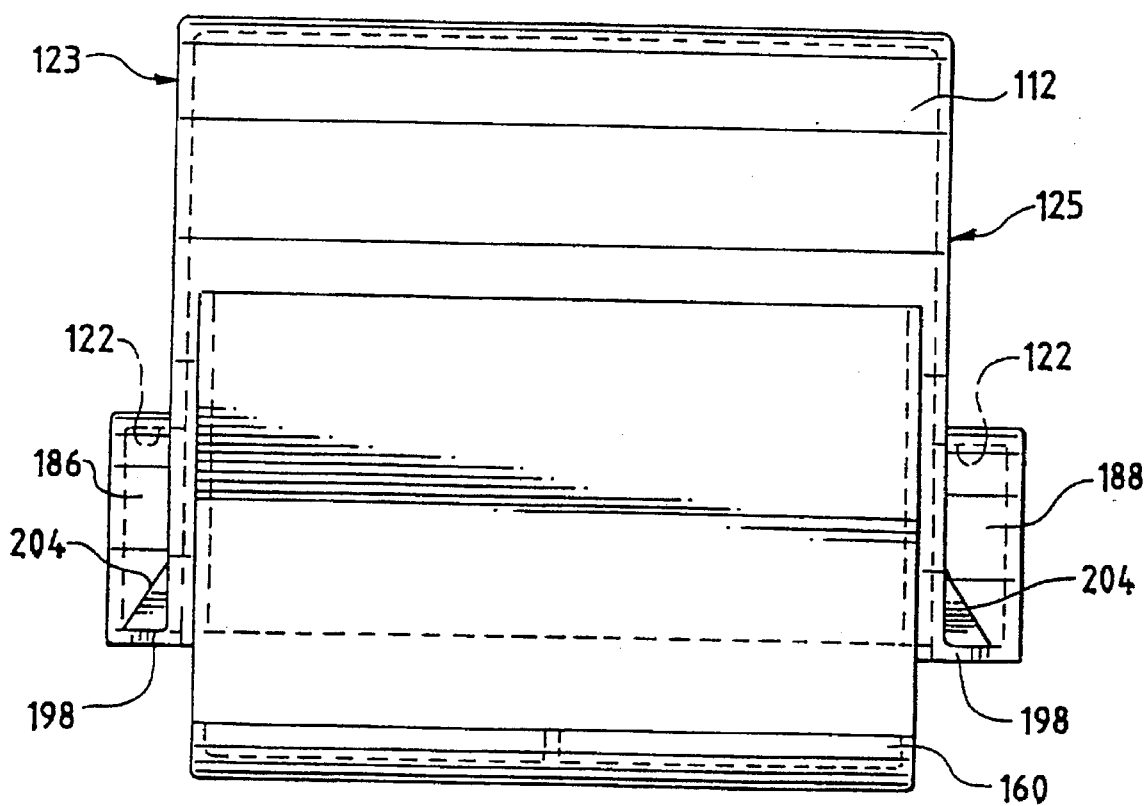
FIGS. 3a and 3b are front and rear elevational views, respectively, of the upper housing member of FIG. 2.
Figure 3B:
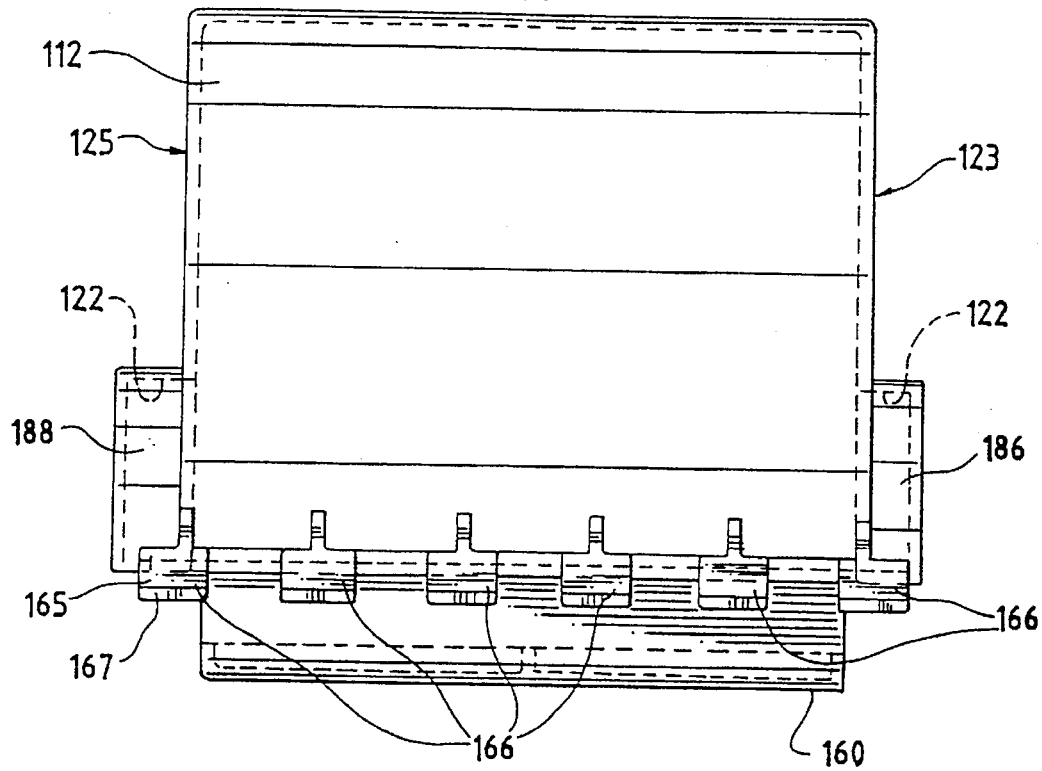

A preferred embodiment of a reloadable film canister system 100 of the present invention is illustrated in FIG. 1, with a typical mounting region 102 of a host machine shown in FIG. 1a. A generally clamshell-shaped canister 110 is comprised of an upper and a lower housing member 112, 114 mounted on a base plate 116. The upper and lower housing members 112, 114 enclose a reel 118 (shown in FIG. 18, for example) for holding web material such as paper or film 120. The reel 118 is mounted onto bearing surfaces 122 on the interior walls of left and right sides 123, 125, respectively, of the housing members 112, 114.

Figure 14A:
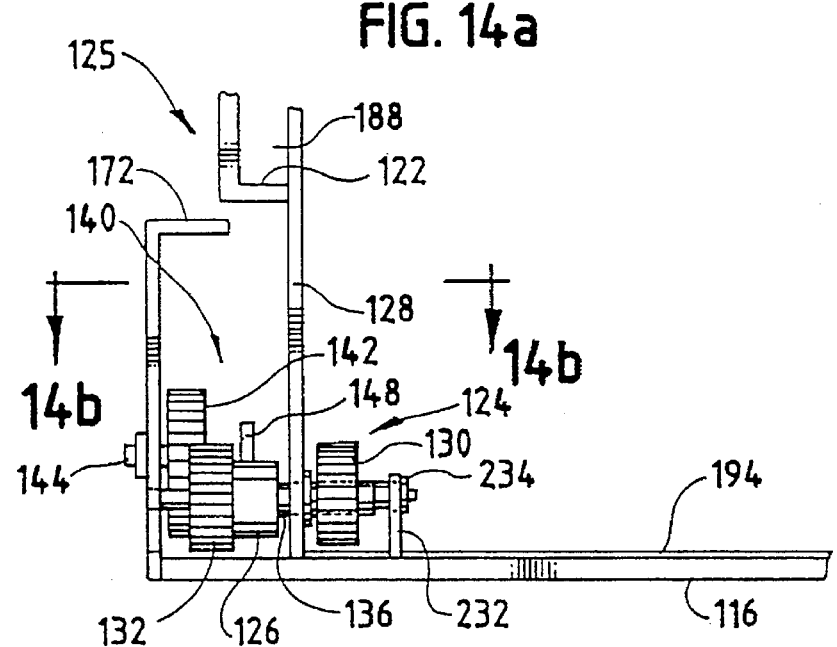
FIG. 14a shows a rear elevational view taken along lines 14a—14a of FIG. 14b of a first detectable assembly operatively connected to the gear system of the present invention.
Figure 14B:
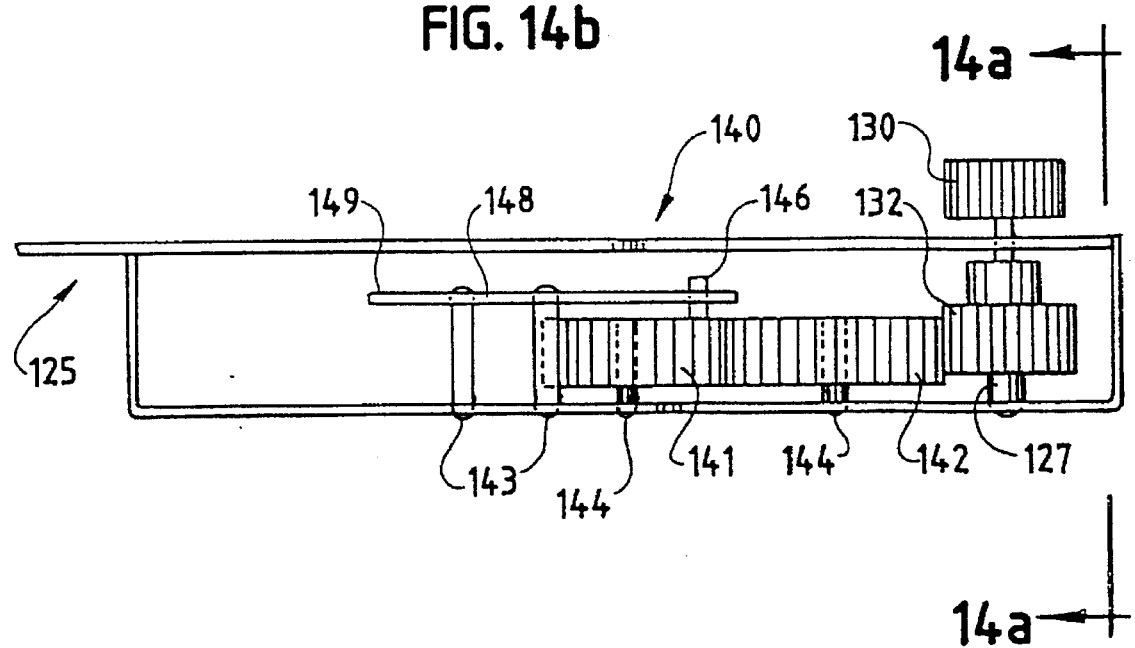
FIG. 14b shows a top view taken along lines 14b—14b of FIG. 14a of the first detectable assembly operatively connected to the gear system.

Referring to FIGS. 14a–b and 16a–b, a gear assembly 124 is mounted by a shaft 126 extending through a wall 128 at the rear of the lower housing member 114. A first gear 130 is attached on one end of the shaft 126 and positioned inside the canister 110, and a second gear 132 is attached on the other end of the shaft 126 and positioned outside the canister 110. The first gear 130 cooperates with a gear-toothed flange 134 of the reel 118, as described in detail in reference to FIGS. 18 and 20. The second gear 132 cooperates with a detectable assembly 140/150 such as shown in FIGS. 14a,b and 15, or FIGS. 16a,b–17a,b. The shaft 126 preferably extends through a light-sealable opening 136 in the lower housing member 114.

Referring once more to FIG. 1, the film 120 is pulled off the reel 118 and out of the canister 110 through an exit slot 138 formed by a front edge 160 of the upper housing member 112 and a front edge 162 of the lower housing member 114. The housing members 112, 114 are preferably attached by a hinge assembly 164 comprising mating flanges 166, 168 at the rear of the canister 110. A locking mechanism 170 is provided at the left and right sides 123, 125 of the canister 110 to ensure that the canister is not accidentally opened and the film 120 is not damaged by exposure to light.

A safety shroud 172 is located on the right side 125 of the lower housing member 114 to prevent human contact of the moving parts of the system 100 during installation into or removal from the host machine. The terms front and rear as used herein refer to the relative locations of the canister's film exit slot 138 and hinge assembly 164, respectively. When mounted within the host machine, the reloadable film canister system 100 has its right side 125 located to the rear of the host machine's canister mounting region 102, so that the detectable assembly 140/150 of the system 100 may communicate with the host machine's sensor mechanism.

The base plate 116 for supporting the canister 110 and reel 118 in the host machine preferably includes cutouts 174 which mate the base plate 116 in proper position on the mounting region 102 of the host machine, as indicated in FIG. 1a. That is, the mounting region 102 conventionally includes horizontal and vertical plate members 176, 178 to ensure proper positioning of the canister 110 and film 120 and for mating with mechanisms, such as a sensor 180, of the host machine.

The film 120 may be pulled out of the canister 110 by a metered feed-roller assembly (not shown) coupled to a stepper motor (not shown). The tension of the film 120 and any rollover travel of it out of the canister 110 may be regulated by a spindle, drive or brake means (not shown) external to the canister 110. To facilitate the insertion of the reel 118 and film 120 into a canister which may be semi-permanently mounted in the host machine, one end 183 of the reel 118 is advantageously slightly longer than the other end 182. Thus, the reel 118 may only be inserted in the canister 110 so that a tab 184 of the film 120 is properly aligned to unroll with the tab 184 and film 120 exiting downwardly from the front of the canister. Notches may also be provided on one reel end 182, 183 to aid in the identification of the reel and film positioning. Loading of the film 120 into the canister 110 may thus be performed in a darkened room.

Film Canister System

Referring now in detail to FIGS. 2-4 and 5-7, the upper and lower housing members 112, 114 of the canister 110 are comprised of a light opaque material and are conventionally black in color. Typically, the housing members 112, 114 are formed from a suitable thermoplastic, such as high impact polystyrene. These housing members 112, 114 cooperate to receive ends 182, 183 of the reel 118 in recesses 186, 188, respectively, formed inside the canister 110. These semicircular recesses 186, 188 are formed on inside walls of the left and right sides 123, 125, respectively, of the housing members 112, 114 and are preferably polished to provide bearing surfaces 122 for the free rotation of the reel ends 182, 183. Advantageously, the recess 188 of the right side 125 is extended relative to the recess 186 of the left side 123 and extends at least partially over the shroud 172.

As previously indicated, the right reel end 183 is advantageously somewhat elongated or extended relative to the left reel end 182 and is readily received into the correspondingly extended right recess 188 of the canister. Also, the right reel end 183 is preferably notched, for easy tactile identification of the reel ends in subdued light or even in the dark. Alternatively, the left reel end 182 may be notched or other identifying methods known to those skilled in the art may be implemented, to further aid an operator to more readily identify the correct placement of the film 120 and reel 118 into the canister 110 in the dark.

When mated, the housing members 112, 114 form a generally cylindrical body, with its longitudinal axis extending between the generally circular left and right sides 123, 125. The canister 110 forms a light-tight and dust-free enclosure for the reel 118 and film 120. A lower portion 192 of the lower housing member 114 is substantially rectangular in shape for greater stability of the canister 110. (See FIGS. 5 and 7.) The bottom 194 of the lower portion 192 is also then able to accommodate screws (not shown) received through openings 196 for attachment of the housing member 114 to the base plate 116, without interference of the screws with the reel 118 mounted in the lower housing member 114.

The components of the film exit slot 138 at the front of the canister 110 are shown to the right in FIGS. 2 and 5. The upper front edge 160 of the canister overlaps the lower front edge 162 of the canister to provide a light-tight seal. The upper front edge 160 is substantially straight. The lower front edge 162 is also substantially straight such that the lower front edge 162 is substantially parallel to the upper front edge 160. The upper and lower front edges 160, 162 have an inside lining of a light-sealing material (not shown), which is preferably strips of velvet. The nap of the velvet material is of a thickness such that the clearance of the exit slot 138, between the strips of velvet, accommodates 4-7 mm thick film without substantial friction thereon. Alternatively, strips of other plush or foam material may be used as the light-sealing material where the material thickness is chosen to provide a substantially light-tight seal at the exit slot 138 without substantial frictional contact with the film 120.

Figure 4:
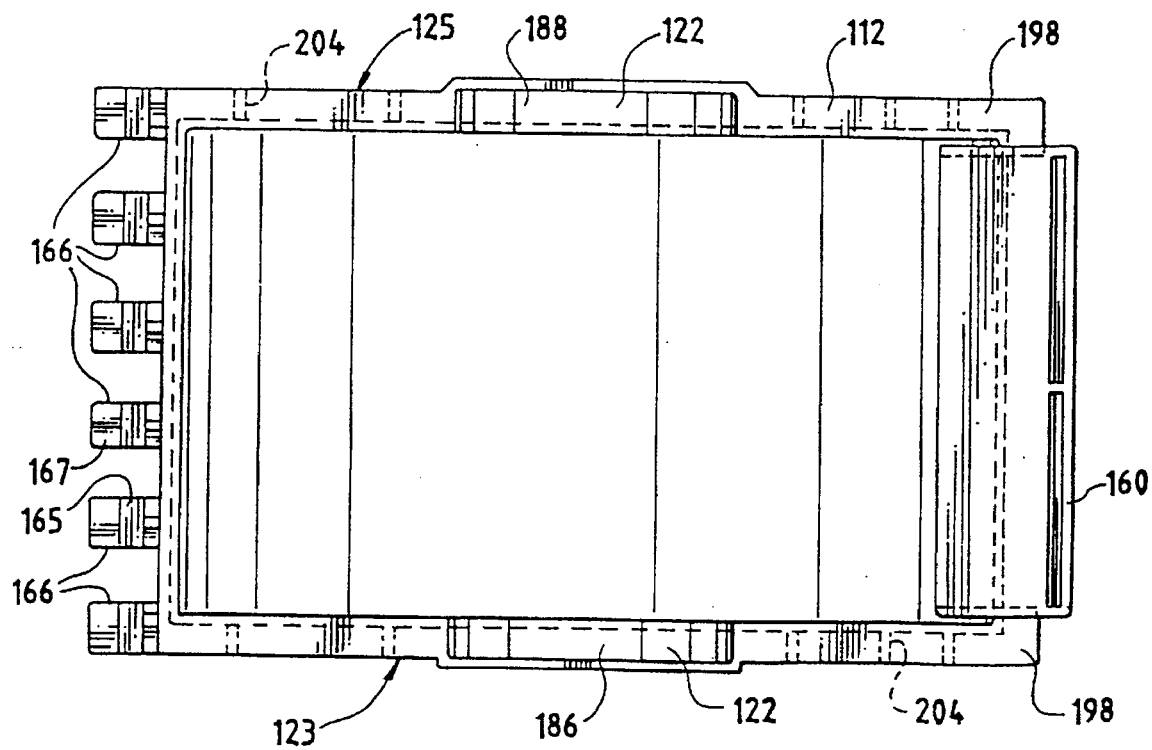
FIG. 4 shows a top plan view of the upper housing member of FIG. 2.

A feature of this invention is that the upper housing member 112 may be easily physically removed from the lower housing member 114 by virtue of the hinge assembly 164 of the canister 110 as shown to the left in FIGS. 4 and 7. As shown, segmented flanges 166, 168 are respectively provided at the rear of the housing members 112, 114 such that the individual upper flange segments 166 are received into respective spaces 169 between the lower flange segments 168. Preferably, the upper flanges 166 have angled portions 165 and horizontal ends 167, as shown in FIG. 2.

The internal edges of the angled portions 165 and ends 167 are aligned by internal edges of the lower flange segments 168 to advantageously provide automatic alignment of cooperating light seals 198, 200, respectively, formed on the upper edge of the lower housing member 114 and the lower edge of the upper housing member 112.

The lower flanges 168 are preferably horizontal as shown in FIG. 5 and facilitate the insertion and removal of the upper housing member 112 in the cramped canister area of the host machine. This allows both the reel and the new unexposed reel of film to be easily installed. Without this feature, it would be necessary to remove the entire film canister system 100 from the host machine each time a new reel of film is installed since upward, opening motion of the upper housing member 112 is limited to about 45 degrees, as shown in FIG. 7a, due to the presence of a wall 151 on that side of the host machine interior. Such limited 45 degree opening between the upper and lower members 112, 114 is not sufficient to physically remove the exhausted reel and replace it with a reel of unexposed film.

The hinge assembly 164 preferably extends substantially the length of the rear of the canister 110. The mating flanges 166, 168 prevent light from entering the canister 110 through the hinge assembly 164. Additional light baffles are provided along the side edges of the upper and lower housing members 112, 114 and are comprised of extensions 198 of the upper housing member 112 which are received into depressions 200 formed in slightly wider extensions 202 of the lower housing member 114. The upper extensions 198 are shown in FIG. 4 and the lower extensions 202 and depressions 200 are shown in FIG. 7. Wedge-shaped struts 204 are indicated along the extensions 198, 202 in FIGS. 2 and 5 and are preferably included to provide added structural integrity to the extensions 198, 202.

A preferred construction of the locking mechanism 170 is shown in FIG. 1. As indicated, a generally C-shaped clip 206 is provided near the front of the lower housing member 114 at the left and right sides 123, 125. It is preferably mounted by a hinge 208 extending through wedge-shaped supports 210, similar to the struts 204 along the extensions 198, 202. The hinge 208 allows the locking clip 206 to pivot upward wherein the concave side of the clip 206 securely captures the upper extension 198, with a tight fit. The clip 206 is sufficiently flexible to extend slightly in capturing the upper extension 198, and releases the extension 198 upon downward/outward pressure on the clip end. It is obvious to those skilled in the art that other conventional locking means may alternately be used in the present invention without loss of the advantages of the present invention.

Figure 8:
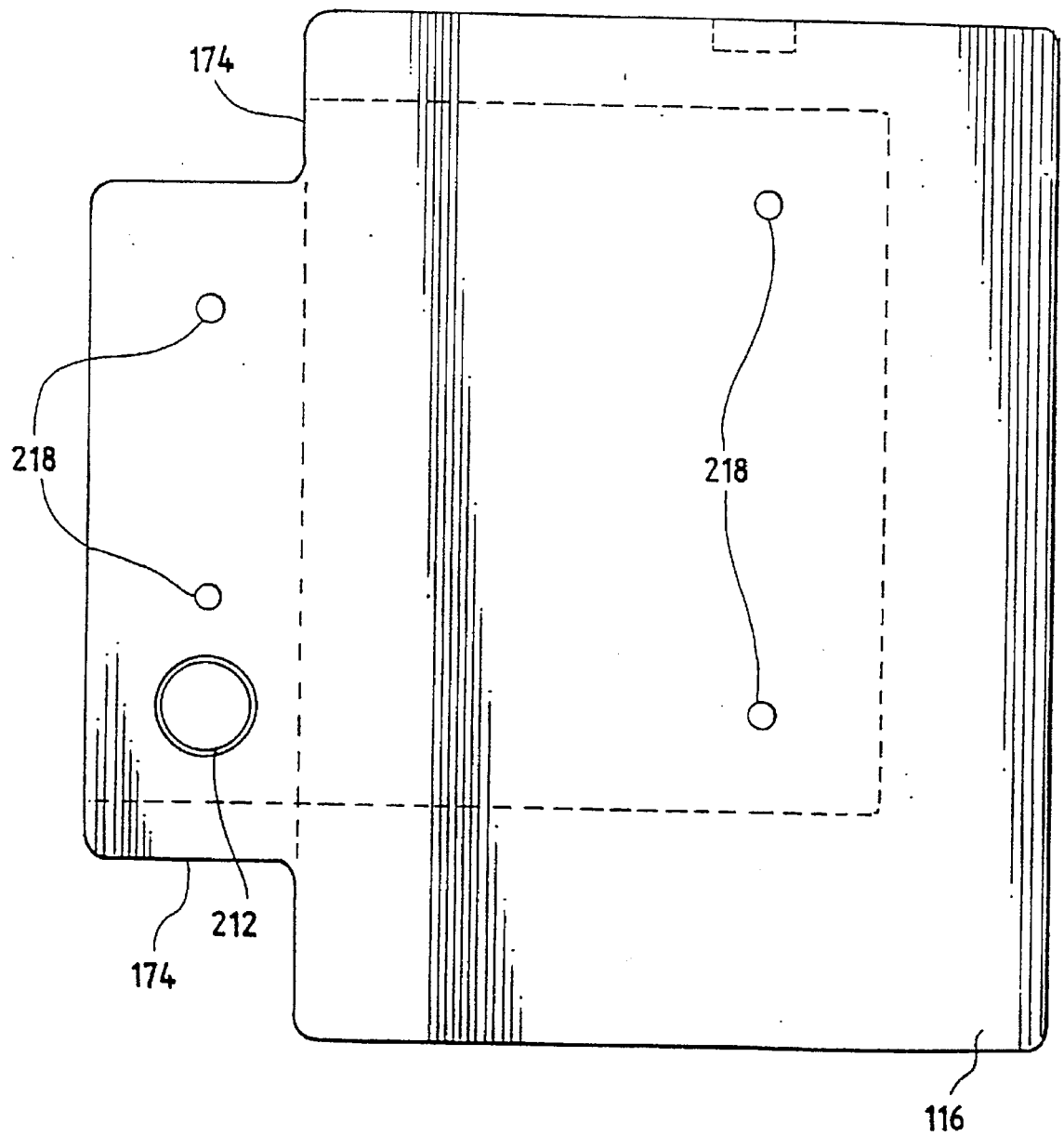
FIG. 8 shows a top plan view of the base plate of the reloadable film canister system of FIG. 1.

As illustrated in FIGS. 1 and 8, the base plate 116 extends somewhat beyond the length of the canister 110 as measured along its longitudinal axis. The base plate 116 also extends substantially the width of the canister 110, measured from the front exit slot 138 to the rear hinge assembly 164. Cutouts 174 are provided as required for mounting of the reloadable film canister system 100 in the host machine, and also reduces the weight of the base plate 116. A hole 212 is provided to allow a post 214 in the host machine mounting region 102 (FIG. 1a) to be received therethrough. A hole 216 in the bottom 194 of the lower housing member 114 (FIGS. 5 and 7) also accommodates the post 214. Moles 218 are also provided in the base plate 116 for attachment with the lower canister 114 via screws (not shown). The base plate 116 supports the weight of the canister 110, reel 118, film 120 and detectable assembly 140/150 in the host machine.

The lower housing member 114 has the safety shroud 172 positioned above the gear assembly 124 and attached to the base plate 116. The purpose of the shroud 172 is to serve as a safety shroud to prevent the host machine operator's hands from touching the detectable assembly 140/150 as he or she reaches into the host machine's canister mounting region 102 to install or remove the reloadable film canister system 100. The shroud, however, is not light-tight and is external of the interior light-tight space within the canister 110. The detectable assembly 140/150 is positioned on the base plate 116 between the lower housing member 114 and the shroud 172 for cooperation with the gear assembly 124, and therefore the safety shroud 172 preferably extends the width of the canister side 125 to also cover the detectable assembly 140/150. Although a four-sided barrier is preferred, front and rear portions of the shroud 172 may be omitted and still adequately provide the desired measure of safety from the moving parts of the detectable assembly 140/150.

Figure 13A:
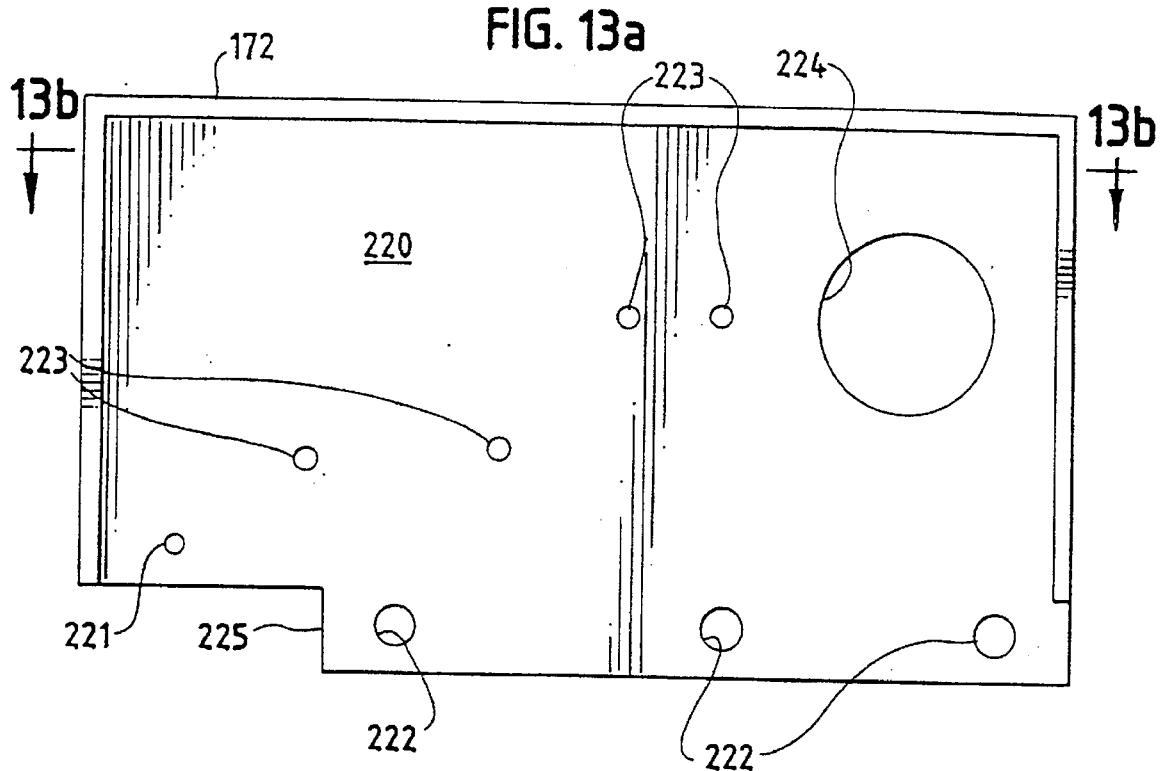
FIG. 13a shows a left side elevational view of the security shroud of the system of the present invention.
Figure 13B:
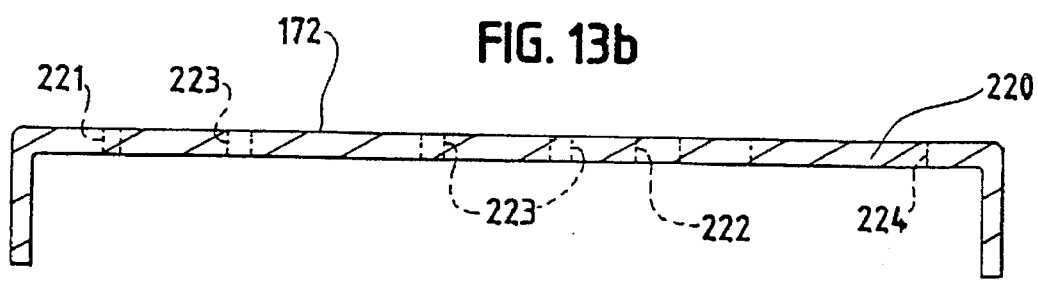

Referring to FIGS. 13a and 13b, the shroud 172 is preferably formed of molded plastic and has four sides, with its largest side 220 including small holes 222, 223 for fasteners and a larger hole 224 to allow communication with a sensor 180 of the host machine (FIG. 1a) therethrough. In alternative embodiments, more or fewer holes than those shown, of appropriate size(s), may be included on the shroud 172. A corner cutout 225 accommodates one of the horizontally mounted plates 176 of the host machine which is located on its mounting region 102. The lower holes 222 of the shroud 172 receive screws to attach the shroud to the base plate 116, and the holes 223 receive fasteners to fasten the detectable assembly 140/150, described below, to the shroud 172. A hole 221 in the shroud 172 is used to mount one end of the gear assembly 124, as described below. In alternative embodiments, however, it is understood that the detectable assembly 140/150 may be mounted directly to the base plate 116 instead of the shroud 172, using mounting posts and other methods known to those skilled in the art.

Figure 9A:
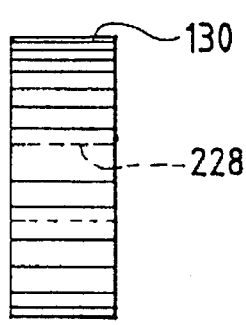
FIGS. 9a–b shows side and front elevational views of the inner gear of the system of the present invention.
Figure 9B:
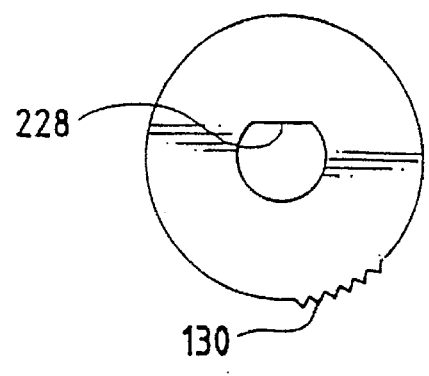
Figure 10A:
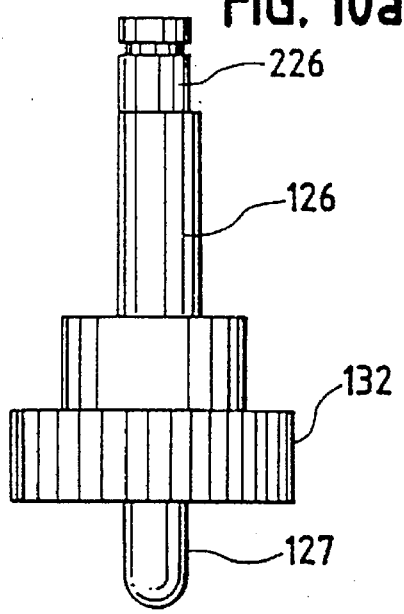
FIGS. 10a–b shows side and front elevational views of the outer gear of the system of the present invention.
Figure 10B:
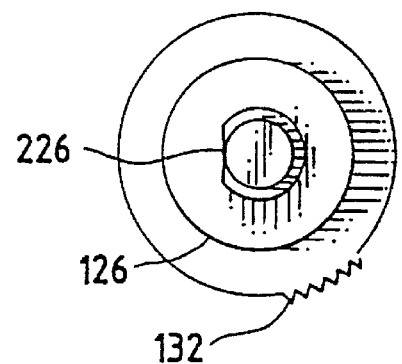
Figure 11A:
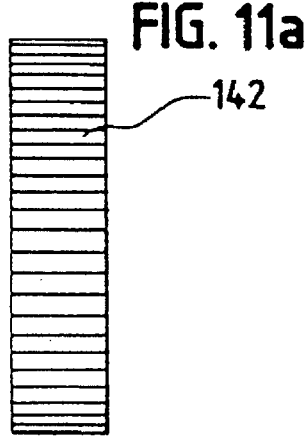
FIGS. 11a–d shows side and front elevational views of gears for a mechanical detectable assembly of the system of the present invention.
Figure 11B:
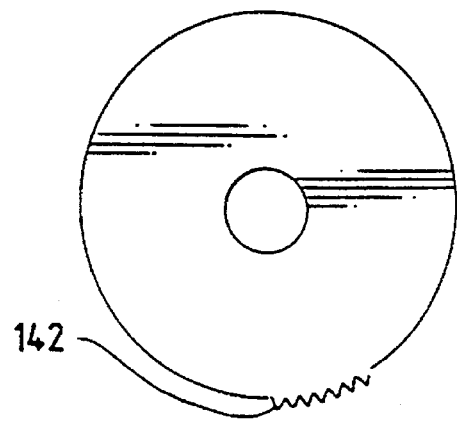
Figure 11C:
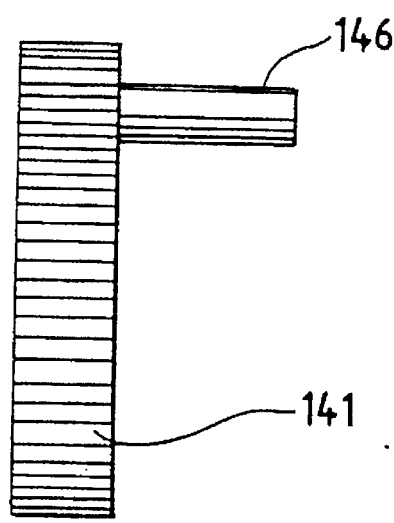
Figure 11D:
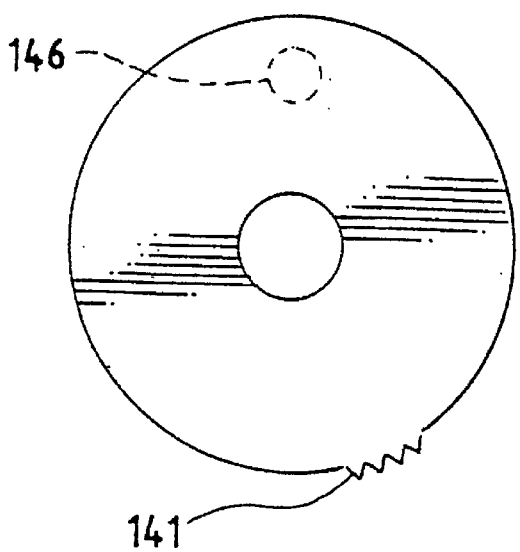

Referring to FIGS. 9 and 10, the first and second gears 130, 132, respectively, are shown in their preferred construction. The second gear 132 preferably has a mounting shaft 126 which is inserted through a light-sealable hole 136 on the lower housing member 114 such that the second gear 132 is outside and the first gear 130 is attached on the shaft 126 on the inside of the housing member 114. The shaft 126 has multiple diameters and an end portion 226 with a straight or flat side for fixing and rotating the first gear 130, which has a mating, flat-sided opening 228 of substantially the same diameter as the end portion 226. The end of the shaft 126 is received through a hole 230 in a wall 232 formed on the bottom 194 of the lower housing member 114 and indicated in FIGS. 6 and 7. This elongated, triangular wall 232 is preferably molded into the housing member bottom 194 and does not interfere with the reel 118 or film 120. A fastener 234 is received on the end of the shaft 126 which extends through the wall 232. Preferably, a short shaft 127 having a blunt end extends orthogonal to the other side of the second gear 132 from the shaft 126, and the shaft 127 is received in the hole 221 of the shroud 172 to mount the end of the gear assembly 124 located the farthest from the canister housing 114.

Figure 18:
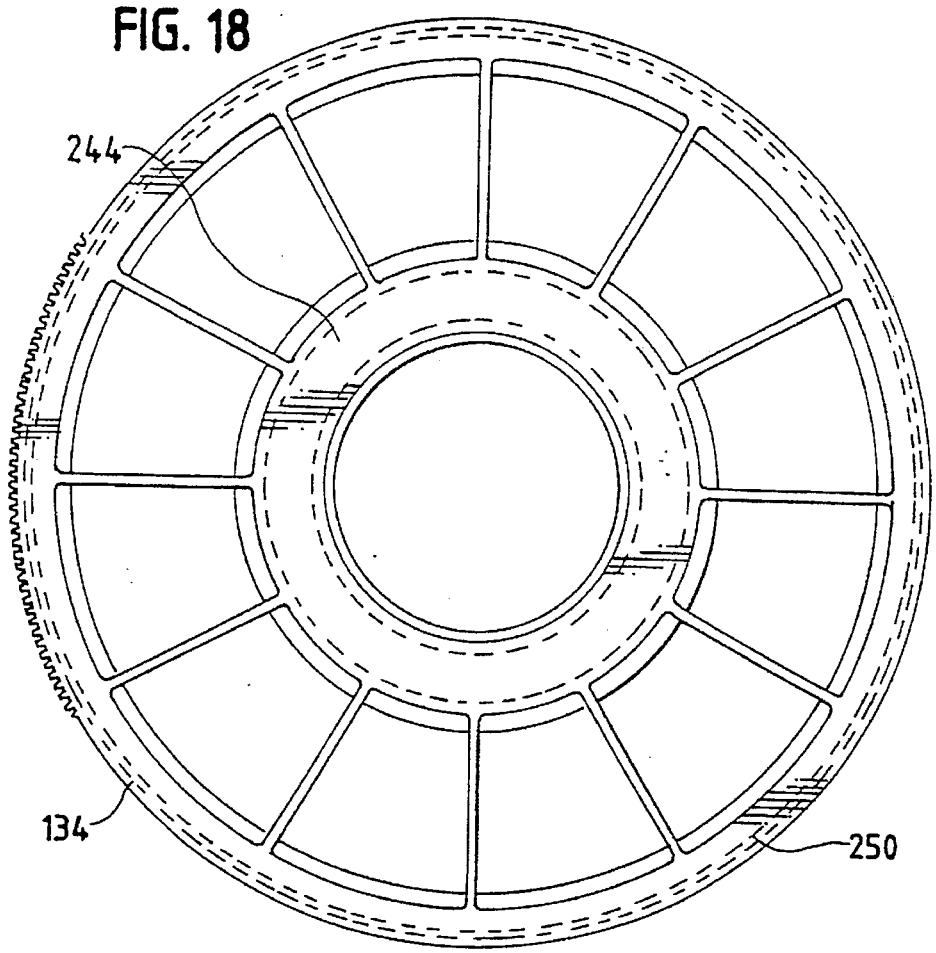
FIG. 18 shows an outside elevational view of a gear-toothed reel of the reloadable film canister system of the present invention.
Figure 20:
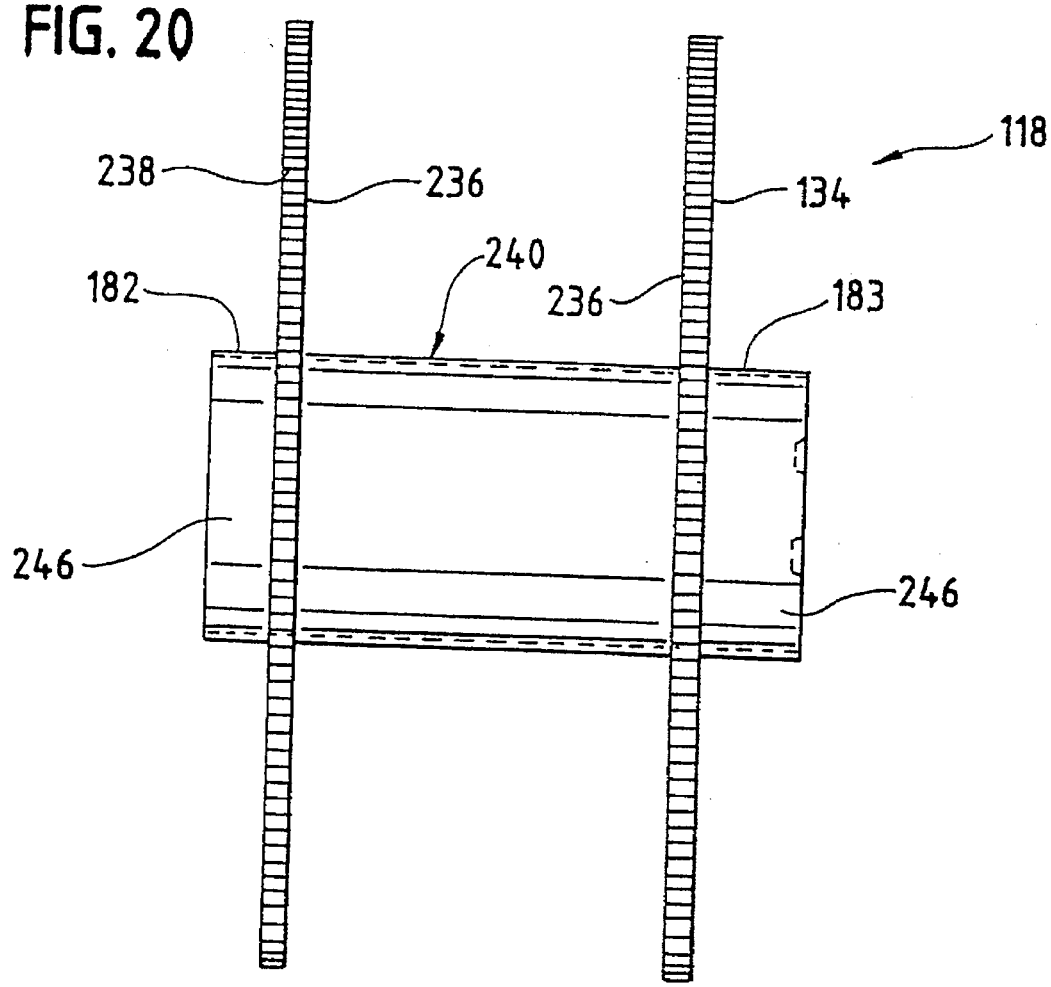
FIG. 20 shows a front elevational view of the reel of the present invention.

A preferred embodiment of the reel 118 constructed in accordance with the present invention is shown in FIGS. 18 and 20, wherein a first flange 134 of the reel 118 has gear teeth 236 which mate with the first gear 130 of the gear assembly 124 described herein. A second flange 238 of the reel 118 is shown with gear teeth, although in alternative embodiments only the mating flange 134 is required to have gear teeth 236.

Figure 19:
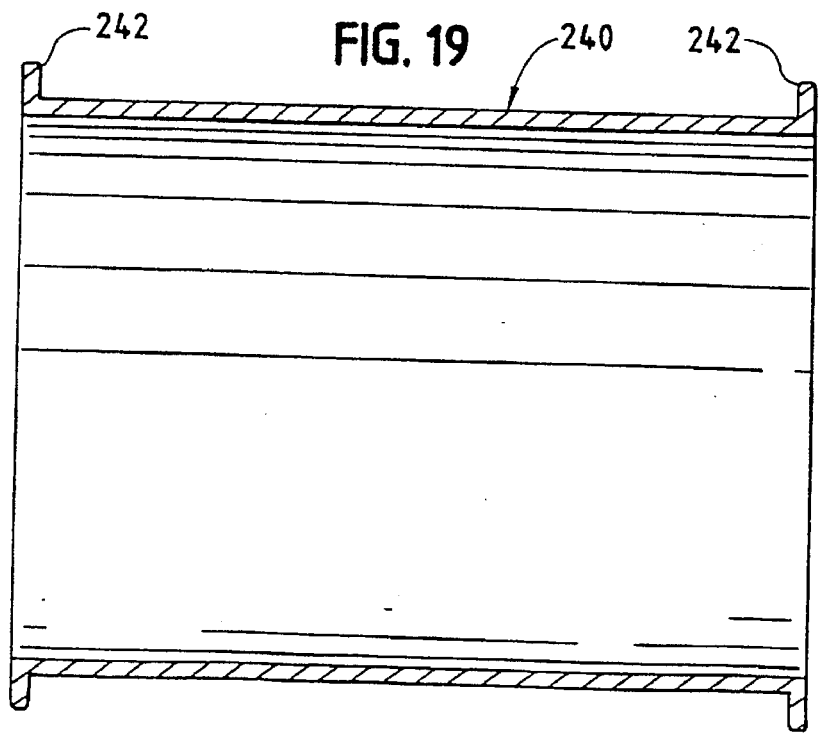
FIG. 19 shows a cross-sectional view of the core of the reel of the present invention.

The first and second flanges 134, 238 are spaced apart along the length of a cylindrical core 240 of the reel 118, shown in FIG. 19, wherein its core ends 242 are preferably sonically welded to inner depressions 244 of the flanges 134, 238 using methods known to those skilled in the art. For 105 mm microfilm, the flanges 134, 238 are located such that their inside surfaces are approximately 105 mm (4⅛") apart. The core 240 is preferably hollow to allow insertion of a mandrel (not shown) during loading of the film 120 onto the reel 118. The core 240 and flanges 134, 238 are preferably constructed of material similar to the housing members 112, 114, as described above. Exterior surfaces 246 of the ends 182, 183 of the reel 118 are preferably polished smooth for nearly frictionless rotation inside the canister 110. As previously described, the ends 182, 183 are received into recesses 186, 188 on the sides 123, 125 of the upper and lower housing members 112, 114. For easy tactile identification, notches may be provided on one of the reel ends 182, 183, and for proper insertion into the canister the right reel end 183 is preferably extended relative to the left reel end 182.

Reel Detectable Assemblies

Two common prior art reel sensing mechanisms of host machines involve either 1) inductive detection of metal circular disc elements typically attached to the reel located within the light-tight enclosure, or 2) the detection of a light source interrupted by a flag which is toggled by the reel's rotation. The first mechanism may comprise an inductive-type sensor which generates an oscillating magnetic field. As each metal circular disc element of the reel disk rotates past the sensor, an electrical current flows in the metal disk and changes the magnetic field, which then is seen as an output voltage change of the sensor. Thus, the rotation of each metal circular disc element within the light-tight enclosure is registered and the information is used to calculate the amount of film removed from the reel.

Figure 12:
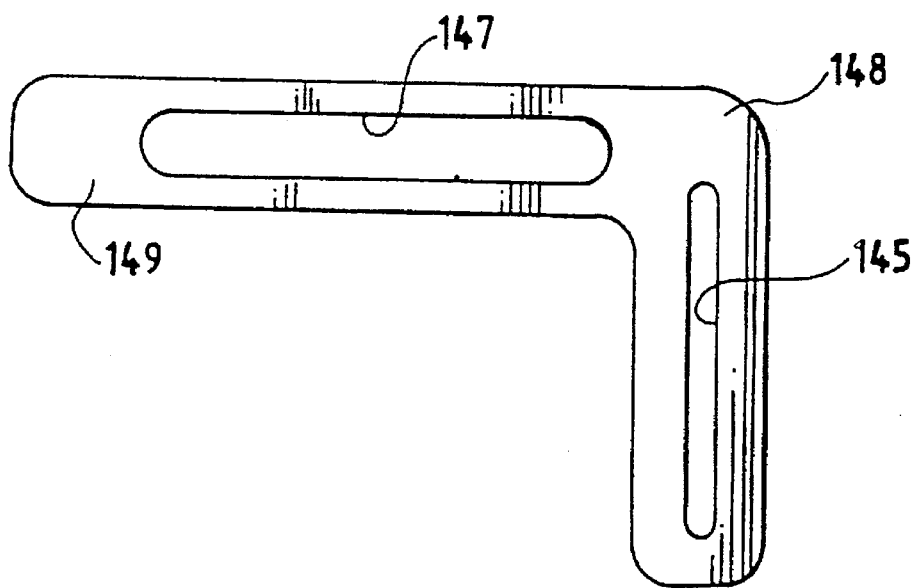
FIG. 12 shows a side elevational view of an arm of the mechanical detectable assembly of the system of the present invention.
Figure 15:
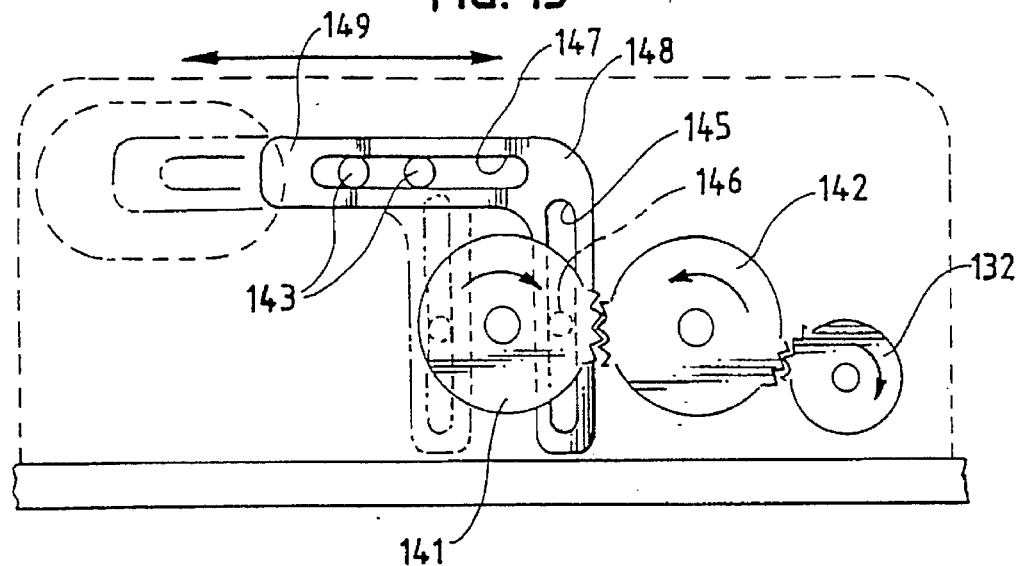
FIG. 15 shows the gears and arm of the first detectable assembly of FIGS. 14a and 14b.

A preferred embodiment of a mechanical detectable assembly 140 compatible for use with inductive sensors is shown in FIGS. 14a,b and 15. The second gear 132 of the canister's gear assembly 124 mates with a gear 142, also shown in FIG. 11 which in turn drives a gear 141. Gears 141, 142 are mounted on shafts 144 which are supported on the shroud 172. The gear 141 has a pin 146 extending at right angles toward the canister housing 114 and away from the shroud 172. The pin 146 is received in a slot 145 of an L-shaped arm 148, also shown in FIGS. 12 and 15. Secured to the shroud 172 are posts 143 which are received through a second slot 147 of the arm 148 which is orthogonal to the first slot 145, and serve to secure the arm 148 to the shroud 172. A conductive or metallic detectable element 149 is located on the arm 148 forwardly of the slot 147 (to the left in the drawings). The posts 143 also serve to guide the arm movement in a reciprocal linear path, shown by the arrow, as the pin 146 is rotated and moves up and down in the first slot 145. The metallic detectable element 149 may be of any conductive material known to those of ordinary skill in the art and may be attached to the arm 148 using conventional methods.

As the film reel 118 inside the canister 110 rotates, its gear-toothed flange 134 meshes with the first gear 130 of the canister's gear assembly 124 and causes the simultaneous rotation of the second gear 132 positioned outside of the lower housing member 114. The second gear 132 causes rotation of the gears 141, 142, which in turn causes the pin 146 to rotate in a vertical plane. The motion of the pin 146 causes the arm 148 to linearly move the metallic detectable element 149 proximate the host machine sensor 180.

The number of times that the metallic detectable element 149 reciprocates linearly with respect to the host machine sensor 180, per revolution of the reel 118, is the number of electrical pulses that the host machine sensor will produce for a revolution of the reel 118. Thus, in the preferred embodiment, in each cycle of operation of the detectable element, the detectable element is reciprocated in one direction to approximately the center of the host machine sensor and then in the opposite direction away from the center of the sensor to produce a single pulse. Preferably, the gears 141, 142 have equal diameters such that one rotation of the gear 142 equals one sensed movement of the metallic detectable element 149. Thus, the number of movements of the metallic detectable element 149 is controlled by selection of the gear ratios between the gear-toothed flange 134 and the first gear 130 of the gear assembly 124, and between the gears 141, 142 and the second gear 132 of the gear assembly 124.

Figure 16A:
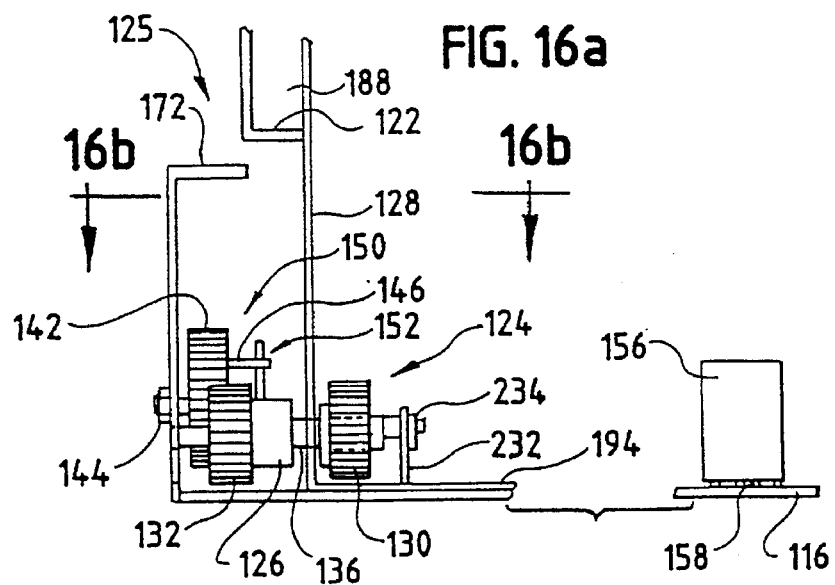
FIG. 16a shows a rear elevational view taken along lines 16a—16a of FIG. 16b of a second detectable assembly operatively connected to the gear system of the present invention.
Figure 16B:
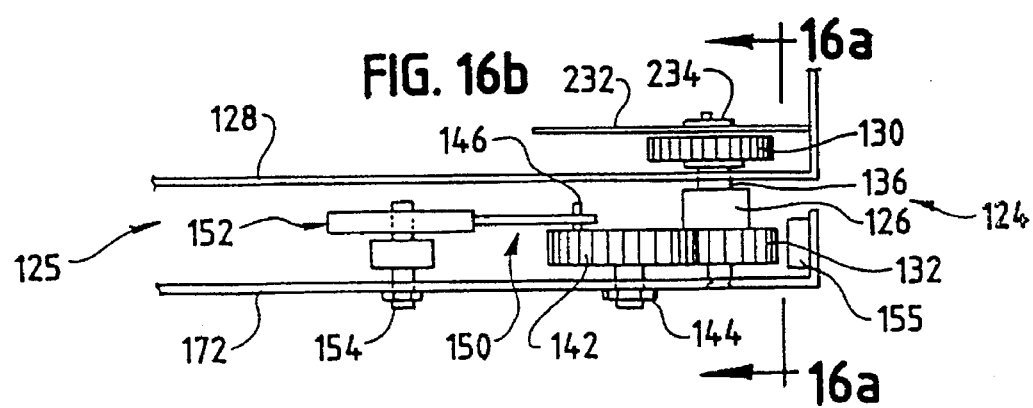
FIG. 16b shows a top view taken along lines 16b—16b of FIG. 16a of the second detectable assembly operatively connected to the gear system.
Figure 17A:
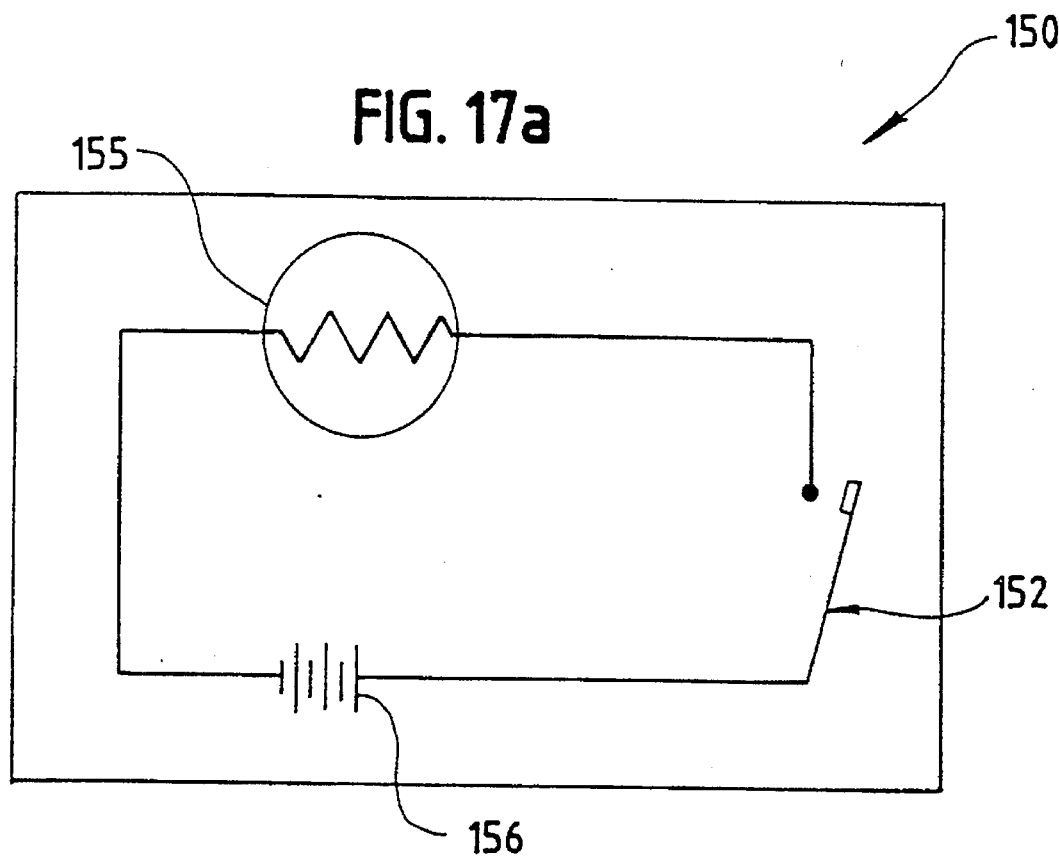
FIG. 17a shows a simplified schematic of the detectable assembly of FIGS. 16a and 16b.
Figure 17B:
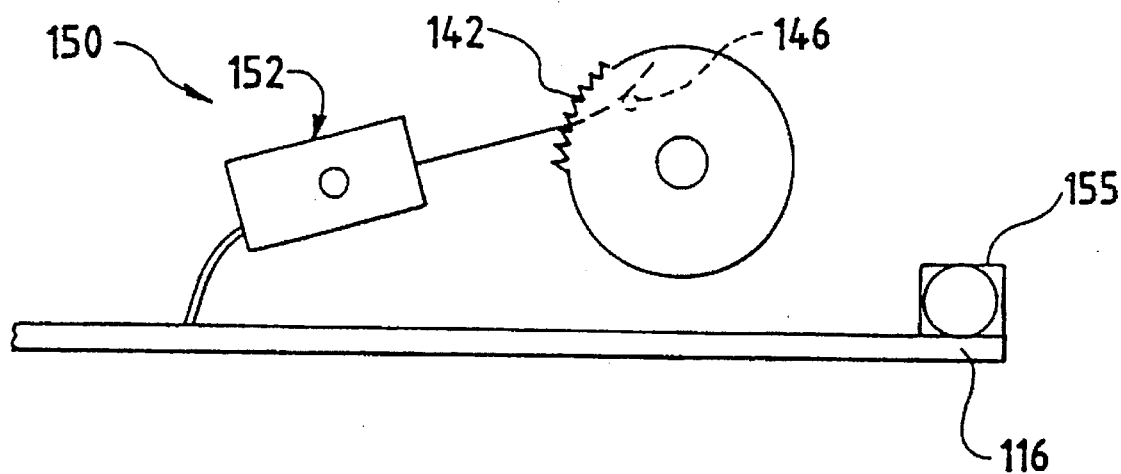
FIG. 17b shows the gear and microswitch of the detectable assembly of FIGS. 16a and 16b.

A preferred embodiment of an electromechanical detectable assembly 150 for use with the second type of host machine sensing mechanism is illustrated in FIGS. 16a,b and 17b. A simplified schematic of the detectable assembly 150 is shown in FIG. 17a. As with the mechanical detectable assembly 140 described herein, a gear 142 mates with the second gear 132 of the canister's gear assembly 124, and the gear 142 includes a pin 146 orthogonal to the gear surface.

In this detectable assembly 150, the rotating pin 146 contacts a microswitch 152 at each revolution. The microswitch 152 is mounted by a shaft 154 to the shroud 172. A power supply 156 for a light emitting diode 155 (LED) preferably comprises a battery which is mounted on the base plate 116 outside the left side 123 of the canister 110, closest to the operator of the host machine. The battery 156 is preferably coupled by contacts 158 on the base plate 116 which are connected to wires routed through holes (not shown) in the base plate 116. The LED 155 is preferably mounted in plastic and screwed onto the base plate 116 as well. Because it is mounted external to the canister 110, removed from the film 120, the LED 155 does not have to be shielded. It is electrically coupled to the power source 156 by wires (not shown). The LED 155 is positioned between an existing LED (not shown) of the host machine and the host machine's sensor (not shown). The conventional constructions of the microswitch 152 and LED 155 are known to those of ordinary skill in the art. In a preferred embodiment, a second battery is provided adjacent the power source 156. The second battery and associated circuitry (not shown) act as a low power indicator and may use an audible alarm or buzzer of construction known to those skilled in the art.

While the host machine LED emits a continuous light which is to be interrupted, the instant LED 155 emits pulses of light corresponding to the microswitch activation caused by the gear 142. One rotation of the gear 142 equals one contact with the microswitch 152 and therefore one pulse of light. The number of light pulses per revolution of the film reel 118 is controlled by the gear ratios between the gear-toothed flange 134 of the reel, the first and second gears 130, 132 of the gear assembly 124 and the gear 142. In alternative embodiments, either of the detectable assemblies 140/150 may include one or more additional gears to achieve the desired gear ratios. In addition, other types of detectable elements may be utilized which communicate with the canister's gear assembly 124 and the gear-toothed reel 134 in the present invention.

Figure 21:
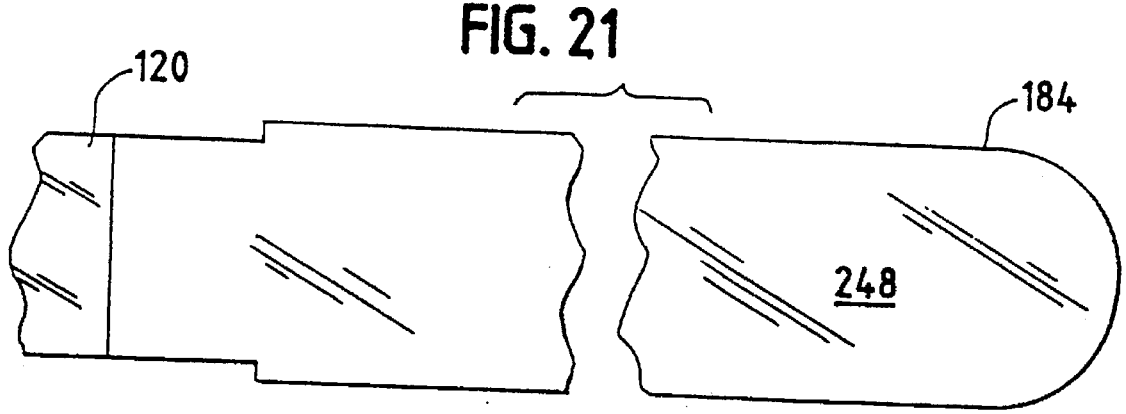
FIG. 21 shows a top plan view of the mylar leader of the reloadable film canister system of the present invention.

The canister 110 of the reloadable film canister system 100 of the present invention provides a light-tight and dust-free enclosure of paper or film 120 for storage and for use in a host machine. In order to provide protection against light and dust during the loading into the canister 110, a mylar leader 248 is preferably attached to the free end of the film 120 on the reel 118. This mylar leader 248 is preferably die-cut to include an easily accessible tab 184 as shown in FIGS. 21 and 22 for access to the film 120 such as for its insertion into a feed-roller assembly.

The mylar leader 248 is opaque and has a length that is preferably about one to one and one-half the circumference of the reel 118, plus an additional two to four inches for the tab 184. The mylar leader 248 preferably has a width slightly greater than that of the film 120 as shown in FIG. 21, e.g., slightly greater than 105 mm, so that the mylar leader 248 is secured in annular grooves 250 on the inside of the flanges 134, 238, as shown in FIG. 23. These grooves 250 are located at a radius measured from the central axis of the core 240 which corresponds to a fully loaded reel; i.e., to a maximum amount of film 120 on the reel 118. Thus, the mylar leader 248 prevents exposure of the film 120 to light and dust during the loading or unloading of the reel 118 into or out of the canister 110. To accommodate the use of the reel 118 with different sizes or lengths of film 120, additional annular grooves 252 are preferably formed on the flanges 134, 238. The grooves 252 are spaced radially inward from the first grooves 250 by a distance known to those skilled in the art.

Although this invention has been disclosed in the context of certain preferred embodiments, it will be understood by those skilled in the art that the present invention extends beyond the specifically disclosed embodiments to other alternative embodiments of the invention. Thus, it is intended that the scope of the present invention herein disclosed should not be limited by the particular disclosed embodiments described above.

What is claimed is:

1. A reloadable microfilm canister system for containing an unexposed roll of microfilm to be delivered to a host machine, said system to be removably installed in a mounting region of the host machine, the host machine having a sensor sensing motion of a detectable element for registering the delivery of the microfilm from said system, said system comprising:

a light-tight reloadable microfilm canister comprising upper and lower housing members attached together by a hinge assembly formed on rear edges of said upper and lower housing members in a clam shell arrangement;

a light seal formed on the bottom edge of said upper housing member which cooperates with a light seal formed on the upper edge of said lower housing member;

a base portion adapted to be received in the mounting region of the host machine, said lower housing member mounted to said base portion;

a reel element adapted to be received into said canister and freely rotatable therein, said reel element having a core portion around which said microfilm is wound and a pair of flanges, one of said flanges having gear teeth substantially around 360 degrees of said flange;

said hinge assembly of said light-tight reloadable microfilm canister allowing removal of said upper housing member from said lower housing member of said canister while said canister system is installed in the host machine so that an empty reel element may be easily removed and a filled reel element easily installed;

a gear assembly comprising an inner gear positioned within said canister for mating with said gear teeth of said reel element flange and an outer gear positioned outside said canister and adapted to be rotated by said inner gear; and a detectable element mounted external to said canister for reciprocal linear motion and operably connected to said outer gear, said detectable element in communication with the sensor of the host machine;

so that the extraction of the microfilm out of said canister by the host machine results in rotation of said reel element and said inner gear, said inner gear rotation causing rotation of said outer gear, and said outer gear rotation causing reciprocal linear operation of said detectable element such that information relating the amount of microfilm delivered from said canister is relayed to the host machine whereby the amount of microfilm remaining on said reel element in said canister may be determined by the host machine.

2. A reloadable microfilm canister system for containing an unexposed roll of microfilm to be delivered to a host machine, said system to be removably installed in a mounting region of the host machine, the host machine having a sensor sensing motion of a detectable element for registering the delivery of the microfilm from said system, said system comprising:

a light-tight reloadable microfilm canister comprising upper and lower housing members attached together by a hinge assembly formed on rear edges of said upper and lower housing members in a clam shell arrangement;

a base portion adapted to be received in the mounting region of the host machine, said lower housing member mounted to said base portion;

a reel element adapted to be received into said canister and freely rotatable therein, said reel element having a core portion around which said microfilm is wound;

a gear assembly comprising an inner gear positioned within said canister for mating with said reel element and an outer gear positioned outside said canister and adapted to be rotated by said inner gear; and a detectable element mounted external to said canister for linear motion and operably connected to said outer gear, said detectable element in communication with the sensor of the host machine;

so that the extraction of the microfilm out of said canister by the host machine results in rotation of said reel element and said inner gear, said inner gear rotation causing rotation of said outer gear, and said outer gear rotation causing linear operation of said detectable element.

3. A reloadable microfilm canister system for containing an unexposed roll of microfilm to be delivered to a host machine, said system to be removably installed in a mounting region of the host machine, the host machine having a sensor sensing motion of a detectable element for registering the delivery of the microfilm from said system, said system comprising:

a light-tight reloadable microfilm canister comprising upper and lower housing members;

a base portion adapted to be received in the mounting region of the host machine, said lower housing member mounted to said base portion;

a reel element adapted to be received into said canister and freely rotatable therein, said reel element having a core portion around which said microfilm is wound and a pair of flanges, one of said flanges having gear teeth substantially around 360 degrees of said flange;

a hinge assembly formed on rear edges of said upper and lower housing members of said light-tight reloadable microfilm canister for the removal of said reel element from said canister while said canister system is installed in said host machine;

a gear assembly comprising an inner gear positioned within said canister for mating with said gear teeth of said reel element flange and an outer gear positioned outside said canister and adapted to be rotated by said inner gear; and a detectable element mounted external to said canister for linear motion and operably connected to said outer gear, said detectable element in communication with the sensor of the host machine;

so that the extraction of the microfilm out of said canister by the host machine results in rotation of said reel element and said inner gear, said inner gear rotation causing rotation of said outer gear, and said outer gear rotation causing linear operation of said detectable element.

4. A reloadable canister system for containing a medium to be delivered to a host machine, said system to be removably installed in a mounting region of the host machine, the host machine having a sensor registering the delivery of the medium from said system, said system comprising:

a canister comprising upper and lower housing members;

a base portion adapted to be received in the mounting region of the host machine, said lower housing member mounted to said base portion;

a reel element adapted to be received into said canister and freely rotatable therein, said reel element having a core portion around which said medium is wound;

a gear assembly comprising an inner gear positioned within said canister for mating with said reel element and an outer gear positioned outside said canister and adapted to be rotated by said inner gear; and a detectable element mounted external to said canister for substantially linear operation and operably connected to said outer gear, said detectable element in communication with the sensor of the host machine;

wherein the extraction of the medium out of said canister by the host machine results in rotation of said reel element and said inner gear, said inner gear rotation causing rotation of said outer gear, and said outer gear rotation causing substantially linear operation of said detectable element such that information relating the amount of medium delivered from said canister is relayed to the host machine whereby the amount of medium remaining on said reel element in said canister may be determined by the host machine.

5. The system of claim 4, further comprising a safety shroud mounted around said detectable element on the outside of said lower housing member of said canister to prevent accidental contact by an operator with moving parts of said gear assembly.

6. The system of claim 5, wherein said detectable element is mounted to said safety shroud and is positioned between said safety shroud and the outer wall of said lower housing member of said canister.

7. The system of claim 5, wherein said outer gear of said gear assembly has portions extending orthogonally on both sides which are received through holes in said safety shroud and said lower housing member of said canister for mounting therebetween.

8. The system of claim 4, further comprising a mating gear operably connected to a slotted arm having said detectable element on one end, said mating gear adapted to rotate upon rotation of said inner gear, said mating gear causing reciprocal linear motion of said detectable element.

9. The system of claim 4, further comprising a mating gear, a microswitch, a light emitting diode and a power source, said mating gear adapted to rotate upon rotation of said inner gear, said mating gear adapted to contact said microswitch thereby causing light to be emitted by said LED in a predetermined relationship with the rotation of said reel element.

10. The system of claim 9, wherein said power source comprises a battery mounted to said base portion on a side of said lower housing member not having said microswitch, said battery electrically connected to said microswitch and said LED by wires routed through said base portion.

11. The system of claim 10, further comprising a second battery mounted on said base portion and electrically coupled to said first battery, said second battery acting as a low power indicator to said first battery.

12. The system of claim 4, wherein said reel element comprises a pair of flanges, one of said flanges having gear teeth for mating with said inner gear of said gear assembly and causing rotation thereof.

13. The system of claim 4, wherein a bottom portion of said lower housing member of said canister has a surface for mounting of said inner gear of said gear assembly inside said canister, said surface positioned below said reel element and the medium contained thereon.

14. The system of claim 4, wherein one of said reel ends is notched to facilitate the proper positioning of said reel element in said canister.

15. The system of claim 4, wherein said upper and lower housing members of said canister combine to form a substantially cylindrical shape, said lower housing member having a bottom portion which is substantially rectangular for stable mounting of said canister onto said base portion.

16. The system of claim 4, wherein substantially all of said system is semipermanently installed into the host machine whereby said reel element is easily removable from said canister without removal of said system from the host machine.

17. The system of claim 16, further comprising a hinge assembly formed on rear edges of said upper and lower housing members of said canister, said hinge assembly providing easy removal of said upper housing member from said lower housing member to enable removal of said reel element from said canister while said system is installed in the host machine.

18. The system of claim 4, further comprising an opaque mylar leader on the end of the medium furthest from the core of said reel element, said leader having a tapered end portion and a width slightly greater than the width of the medium, said leader received in annular grooves formed on inside surfaces of flanges of said reel element.

19. The system of claim 4, wherein the medium comprises 105 mm microfilm.

20. The system of claim 4, wherein the medium comprises paper.

21. A reloadable canister system for containing a medium to be delivered to a host machine, said system to be removably installed in a mounting region of the host machine, the host machine having a sensor registering the delivery of the medium from said system, said system comprising:

a canister comprising upper and lower housing members;

a reel element for holding the medium, said reel element to be received into said canister and freely rotatable therein;

a means of engaging said reel element for coupling the rotation of said reel element from inside said canister to outside said canister; and a mechanism for detecting the amount of said rotation of said reel element and communicating said amount of said rotation to a sensor of the host machine, said detecting mechanism external to said canister and operably connected to said engaging means, said detecting mechanism producing linear motion in response to rotation of said reel element;

wherein the extraction of the medium out of said canister by the host machine results in rotation of said reel element and causes said engaging means to operate said detecting mechanism such that information relating to the amount of medium delivered from said reel element is provided to the host machine whereby the amount of medium remaining on said reel element may be determined by the host machine.

22. A reloadable canister system for containing a medium to be delivered to a host machine, said system comprising:

a canister comprising upper and lower housing members;

a reel element for holding the medium, said reel element to be received into said canister and freely rotatable therein; and a mechanism for detecting the amount of rotation of said reel element, said detecting mechanism external to said lower housing member of said canister and adapted to be operably connected to said reel element inside said canister, said detecting mechanism producing linear motion in response to rotation of said reel element, said detecting mechanism in communication with a sensor of the host machine;

wherein the extraction of the medium out of said canister by the host machine results in rotation of said reel element thereby causing said detecting mechanism to relay information to the host machine on the amount of the medium delivered from said reel element, whereby the amount of the medium remaining on said reel element may be determined by the host machine.

23. A reloadable canister system for containing a medium to be delivered to a host machine, said system comprising:

a canister;

a reel element for holding the medium, said reel element to be received into said canister and freely rotatable therein; and a means of registering the rotation of said reel element and relaying information on the amount of said rotation to a sensor of the host machine, said registering means adapted to be operably connected to said reel element inside said canister and extending from inside said canister to outside said canister, said registering means producing linear motion in response to rotation of said reel element;

wherein the extraction of the medium out of said canister by the host machine results in rotation of said reel element and operation of said registering means whereby said information is relayed to the host machine and the amount of the medium remaining on said reel element may be determined by the host machine.

24. A reloadable canister comprising:

an openable housing which defines an internal region;

a reel adapted to carry a medium wherein the reel is removably insertable into the region so as to be rotatably carried by the housing wherein in response to the medium being drawn off the reel, the reel rotates within the housing;

a position indicating mechanism, separate from the reel and carried by the housing with a first part in the region and a second part, coupled thereto, outside of the housing wherein the first part includes a first rotary element, coupled to the reel, wherein the first rotary element rotates continuously in a first selected rotary direction in response to the rotation of the reel, wherein the second part rotates continuously in a second rotary direction in response to rotation of the first rotary element;

a reel rotation indicating element carried by the position indicating mechanism and coupled to the second part for providing a detectable output indicative of rotation of the reel in response to the medium being drawn therefrom.

25. A canister as in claim 24 wherein the reel carries a plurality of spaced apart position indicating elements.

26. A canister as in claim 25 wherein the position indicating elements include gear teeth.

27. A canister as in claim 24 wherein the first part of position indicating mechanism includes a first gear and the second part includes a second gear and wherein the gears are coupled by a shaft.

28. A canister as in claim 24 wherein the reel rotation indicating element includes a planar element, movable in a selected direction, in response to movement of the second part, so as to provide a detectable output indicative of movement of the reel.

* * * * *